(12) United States Patent
Park et al.

(10) Patent No.: US 12,187,202 B2
(45) Date of Patent: *Jan. 7, 2025

(54) AUTOMATICALLY ADJUSTABLE PARTITION WALL FOR AN AUTONOMOUS VEHICLE

(71) Applicant: Aurora Operations, Inc., Pittsburgh, PA (US)

(72) Inventors: Min Kyu Park, South Pasadena, CA (US); Christopher Matthew D'Eramo, Bethel Park, PA (US); Neil Stegall, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,239

(22) Filed: Sep. 14, 2023

(65) Prior Publication Data

US 2024/0001869 A1 Jan. 4, 2024

Related U.S. Application Data

(63) Continuation of application No. 17/577,881, filed on Jan. 18, 2022, now Pat. No. 11,794,671, which is a
(Continued)

(51) Int. Cl.
*B60R 13/08* (2006.01)
*B60N 2/02* (2006.01)
(Continued)

(52) U.S. Cl.
CPC ........ *B60R 13/0823* (2013.01); *B60N 2/0224* (2013.01); *B60N 2/30* (2013.01);
(Continued)

(58) Field of Classification Search
CPC .... B60R 13/0823; B60N 2/0224; B60N 2/30; G01C 21/343; G01G 19/12; G05D 1/0088;
(Continued)

(56) References Cited

U.S. PATENT DOCUMENTS 1,758,826 A 5/1930 Dellert
1,911,224 A 5/1933 Dellert
(Continued)

FOREIGN PATENT DOCUMENTS

CN 203623483 6/2014
CN 105189313 12/2015
(Continued)

*Primary Examiner* — Gertrude Arthur Jeanglaude
(74) *Attorney, Agent, or Firm* — Dority & Manning, P.A.

(57) ABSTRACT

Systems and methods for automatically adjusting the interior cabin of an autonomous vehicle are provided. In one example embodiment, an autonomous vehicle can include a main body including a floor and a ceiling that at least partially define an interior cabin of the autonomous vehicle. The autonomous vehicle can include a partition wall that is movable within the interior cabin of the autonomous vehicle. The partition wall can extend between the floor to the ceiling of the main body. The autonomous vehicle can include a computing system configured to receive data indicative of one or more service assignments associated with the autonomous vehicle and to adjust a position of the partition wall within the interior cabin based at least in part on the one or more service assignments.

20 Claims, 7 Drawing Sheets

Related U.S. Application Data continuation of application No. 16/174,941, filed on Oct. 30, 2018, now Pat. No. 11,235,712.

(60) Provisional application No. 62/716,055, filed on Aug. 8, 2018.

(51) Int. Cl.

| | |
|---|---|
| *B60N 2/30* | (2006.01) |
| *G01C 21/34* | (2006.01) |
| *G01G 19/12* | (2006.01) |
| *G05D 1/00* | (2006.01) |
| *G06F 3/0482* | (2013.01) |
| *G06Q 10/0631* | (2023.01) |
| *G06Q 10/08* | (2023.01) |
| *G06Q 30/0283* | (2023.01) |
| *G08G 1/01* | (2006.01) |
| *G06F 16/29* | (2019.01) |

(52) U.S. Cl.
CPC ........... *G01C 21/343* (2013.01); *G01G 19/12* (2013.01); *G05D 1/0088* (2013.01); *G05D 1/0212* (2013.01); *G06F 3/0482* (2013.01); *G06Q 10/06315* (2013.01); *G06Q 10/08* (2013.01); *G06Q 30/0283* (2013.01); *G08G 1/0125* (2013.01); *G05D 1/021* (2013.01); *G06F 16/29* (2019.01)

(58) Field of Classification Search
CPC .... G05D 1/0212; G05D 1/021; G06F 3/0482; G06F 16/29; G06Q 10/06315; G06Q 10/08; G06Q 30/0283; G08G 1/0125
See application file for complete search history.

(56) References Cited

U.S. PATENT DOCUMENTS

| | | |
|---|---|---|
| 2,132,279 A | 10/1938 | Wicknick et al. |
| 2,563,347 A | 8/1951 | Long |
| 2,642,119 A | 6/1953 | Dary |
| 3,463,539 A | 8/1969 | Racine et al. |
| 3,632,161 A | 1/1972 | Arfaras et al. |
| 3,637,253 A | 1/1972 | Maule et al. |
| 5,653,262 A | 8/1997 | Hanemaaver |
| 5,738,408 A | 4/1998 | Wu |
| 6,030,037 A | 2/2000 | Ritch et al. |
| 6,264,261 B1 | 7/2001 | Krafcik |
| 6,338,518 B1 | 1/2002 | D'Annunzio et al. |
| 6,350,972 B1 | 2/2002 | Wright et al. |
| 6,540,279 B1 | 3/2003 | Bargiel |
| 6,925,679 B2 | 8/2005 | Wallach et al. |
| 7,066,519 B2 | 6/2006 | Rhodes et al. |
| 7,090,274 B1 | 8/2006 | Khan et al. |
| 7,156,442 B2 | 1/2007 | McManus et al. |
| 8,010,230 B2 | 8/2011 | Zini et al. |
| 8,019,352 B2 | 9/2011 | Rappaport et al. |
| 8,182,016 B2 | 5/2012 | Kaip et al. |
| 8,186,735 B2 | 5/2012 | Maceri et al. |
| 9,256,852 B1 | 2/2016 | Myllymaki |
| 9,510,682 B2 | 12/2016 | Hasegawa et al. |
| 9,533,625 B2 | 1/2017 | Krishnan et al. |
| 9,821,959 B2 * | 11/2017 | Hognaland ............ B60L 15/40 |
| 10,435,242 B2 | 10/2019 | Lert, Jr. |
| 11,235,712 B2 * | 2/2022 | Park ..................... G05D 1/0212 |
| 2005/0028543 A1 | 2/2005 | Whitehead et al. |
| 2005/0046263 A1 | 3/2005 | Wright |
| 2007/0156540 A1 | 7/2007 | Koren et al. |
| 2008/0185893 A1 | 8/2008 | Behrens et al. |
| 2010/0052374 A1 | 3/2010 | Bell et al. |
| 2015/0006005 A1 | 1/2015 | Yu et al. |
| 2015/0379468 A1 | 12/2015 | Danaher |
| 2016/0280095 A1 | 9/2016 | Frye et al. |
| 2016/0364786 A1 * | 12/2016 | Wankhede .......... G07G 1/0036 |
| 2017/0354996 A1 | 2/2017 | Lim et al. |
| 2017/0166173 A1 | 6/2017 | Lauffer et al. |
| 2018/0079278 A1 | 3/2018 | Kirpichnikov et al. |
| 2019/0340927 A1 | 11/2019 | Goldman et al. |

FOREIGN PATENT DOCUMENTS

| | | |
|---|---|---|
| DE | 4200476 | 7/1993 |
| DE | 19822694 | 11/1999 |
| DE | 102010055365 | 7/2011 |
| EP | 1247473 | 10/2002 |
| EP | 2258579 | 8/2010 |
| FR | 2920011 | 2/2009 |
| JP | 6270307 | 12/2013 |
| JP | 6262937 | 1/2014 |
| KR | 100783510 | 6/2007 |
| WO | WO2012060462 | 5/2012 |
| WO | WO2017156586 | 9/2017 |

* cited by examiner

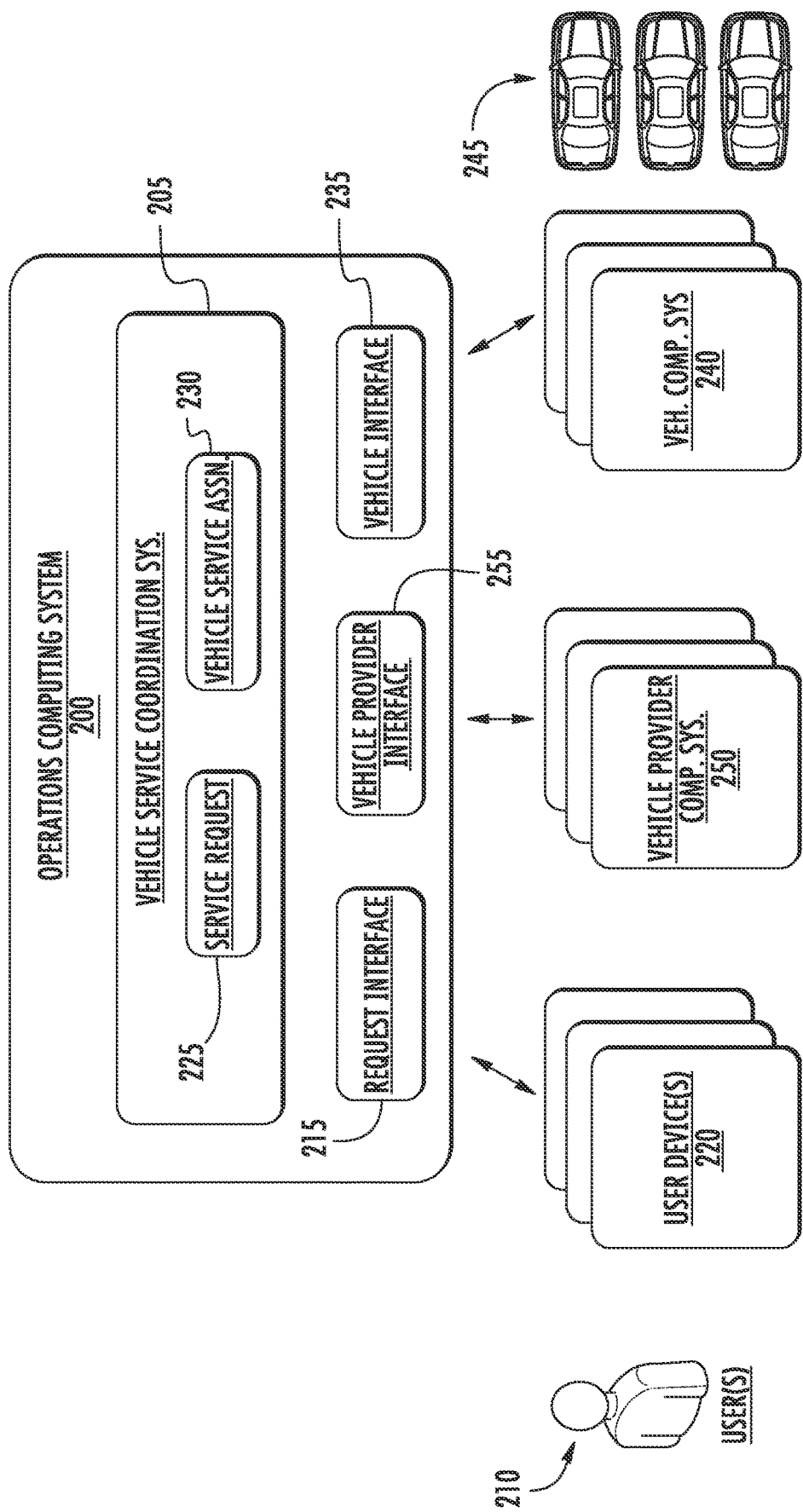

AUTOMATICALLY ADJUSTABLE PARTITION WALL FOR AN AUTONOMOUS VEHICLE

PRIORITY CLAIM

The present application is based on and claims priority to U.S. Non-Provisional patent application Ser. No. 17/577,881 having a filing date of Jan. 18, 2022, which claims priority to U.S. Non-Provisional Pat. No. 11,235,712 having a filing date of Oct. 30, 2018, which claims priority to U.S. Provisional Application 62/716,055 having a filing date of Aug. 8, 2018, which are incorporated herein by reference in their entirety.

FIELD

The present disclosure relates generally to controlling autonomous vehicles. In particular, an autonomous vehicle can be controlled to adjust one or more partition walls within the autonomous vehicle.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to an autonomous vehicle. The autonomous vehicle includes a main body including a floor and a ceiling that at least partially define an interior cabin of the autonomous vehicle. The autonomous vehicle includes a partition wall that is movable within the interior cabin of the autonomous vehicle. The partition wall extends between the floor to the ceiling of the main body. The autonomous vehicle includes a computing system configured to obtain data indicative of one or more service assignments associated with the autonomous vehicle and to adjust a position of the partition wall within the interior cabin based at least in part on the one or more service assignments.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining data indicative of one or more service assignments associated with an autonomous vehicle. The operations include determining a position of a partition wall within an interior cabin of the autonomous vehicle based at least in part on the one or more service assignments. The interior cabin is at least partially defined by a floor and a ceiling of a main body of the autonomous vehicle. The partition wall extends from the floor to the ceiling defining the interior cabin. The operations include communicating one or more first signals to initiate an adjustment of the partition wall to the determined position within the interior cabin of the autonomous vehicle.

Yet another example aspect of the present disclosure is directed to a computer-implemented method for autonomous vehicle configuration. The method includes obtaining, by a computing system including one or more computing devices, data indicative of one or more service assignments associated with an autonomous vehicle. The method includes determining, by the computing system, a position of a partition wall within an interior cabin of the autonomous vehicle based at least in part on the one or more service assignments. The interior cabin is at least partially defined by a floor and a ceiling of a main body of the autonomous vehicle. The partition wall extends from the floor to the ceiling defining the interior cabin. The method includes determining a seat adjustment of one or more seats within the interior cabin of the autonomous vehicle based at least in part on the one or more service assignments. The method includes communicating one or more first signals to initiate an adjustment of the partition wall to the determined position within the interior cabin of the autonomous vehicle and to initiate the seat adjustment of the one or more seats within the interior cabin of the autonomous vehicle.

Other example aspects of the present disclosure are directed to systems, methods, vehicles, apparatuses, tangible, non-transitory computer-readable media, and memory devices for controlling autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 2 depicts an example operations computing system of a service entity according to example implementations of the present disclosure;

DETAILED DESCRIPTION

Figure 1:
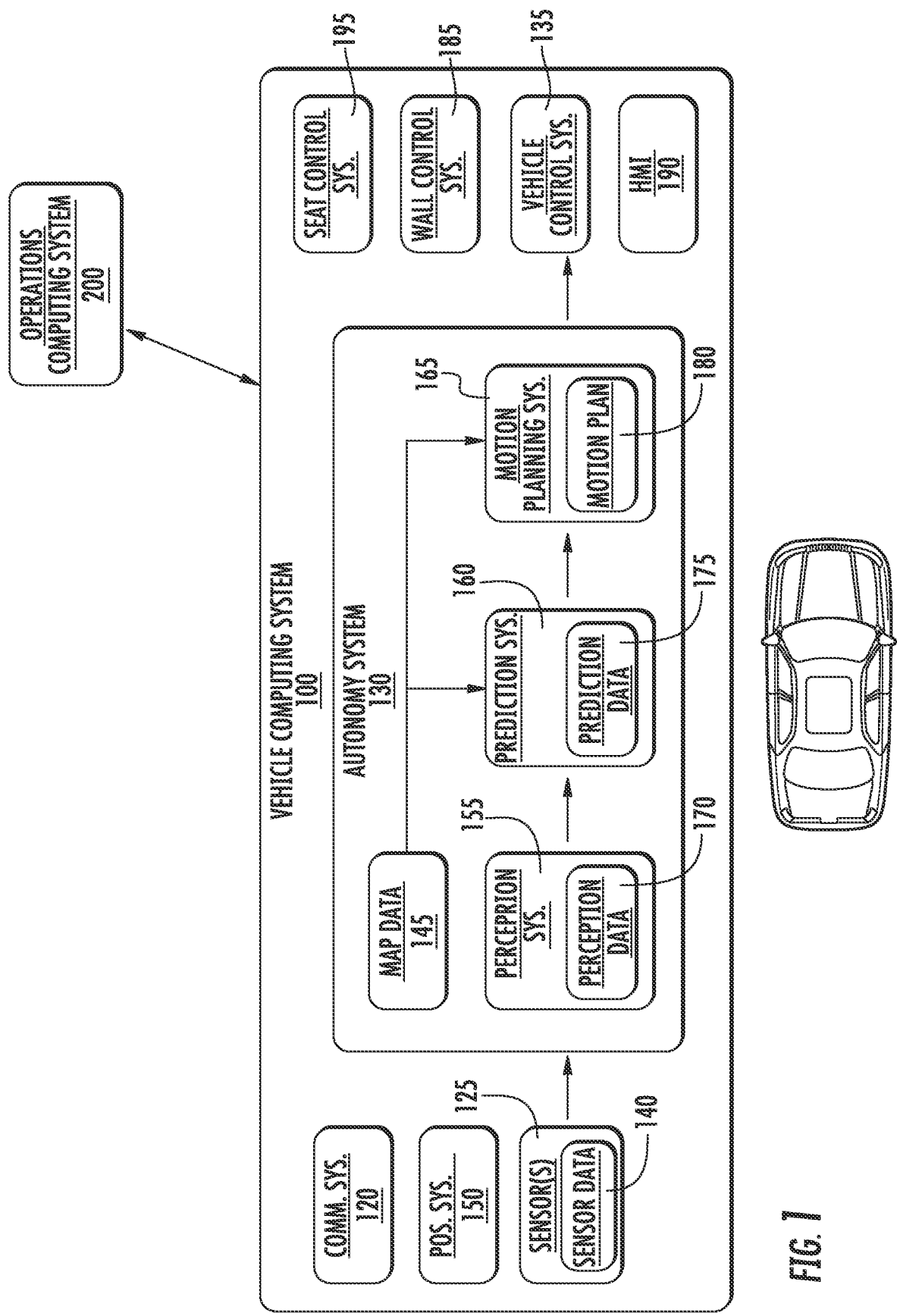
FIG. 1 depicts an example autonomous vehicle computing system according to example implementations of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an improved autonomous vehicle infrastructure that includes an adjustable partition wall, which increases the vehicle's ability to provide vehicle services. For instance, an autonomous vehicle can be utilized to perform vehicle services such as, for example, transportation services (e.g., rideshare services). The vehicle service(s) can be offered (e.g., via a mobile software application, website, etc.) to users by a service entity (e.g., a company that offers and/or coordinates the provision of vehicle services to users). In the event that a user requests a vehicle service, a computing system of the associated service entity can send a service assignment to an autonomous vehicle. The service assignment can include a request for the vehicle to perform the vehicle service for the user and a variety of information about the requested vehicle service including, for example, the number of user(s) and/or item(s) to be transported in the autonomous vehicle. In some implementations, the autonomous vehicle may obtain a plurality of service assignments and pool the assignments in order to concurrently provide vehicle services (e.g., concurrently transport two separate groups of users).

The technology of the present disclosure can improve the ability of the autonomous vehicle to accommodate a variety of service assignments. For instance, the interior cabin of the autonomous vehicle can include a partition wall that can be automatically adjusted based on the number of user(s) and/or item(s) that are to be transported within the autonomous vehicle. The partition wall can provide a physical barrier between different compartments of the vehicle's cabin. The partition wall can be adjusted in real-time by the vehicle's onboard computing system in order to adjust the size of the different compartments. For example, in the event that four users and two small items (e.g., two backpacks, etc.) are to be transported in the autonomous vehicle, the partition wall can be adjusted so that there are four seats within a first compartment intended for the users and enough space in a second compartment intended for storing the two items. In another example, in the event that two different groups of users are to ride in the autonomous vehicle (e.g., for vehicle service pooling), the partition wall can be adjusted such that there are at least two separate compartments within the autonomous vehicle, one for each of the groups. Such adjustments can be made before the user(s)/item(s) enter the autonomous vehicle and without the vehicle traveling to a service depot (e.g., for adjustment by a technician). In this way, the incorporation of the automatically adjustable partition wall can improve the flexibility of the vehicle's infrastructure to accommodate a variety of service requests without the need for the autonomous vehicle to travel to a service depot for re-configuration.

More particularly, an autonomous vehicle (e.g., ground-based vehicle, etc.) can include various systems and devices configured to control the operation of the vehicle. For example, an autonomous vehicle can include an onboard vehicle computing system (e.g., located on or within the autonomous vehicle) for operating the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the autonomous vehicle to communicate with one or more computing systems that are remote from the vehicle, as further described herein.

An autonomous vehicle can perform vehicle services for one or more service entities. A service entity can be associated with the provision of one or more vehicle services. For example, a service entity can be an individual, a group of individuals, a company, a group of companies (e.g., affiliated entities), and/or another type of entity that offers and/or coordinates the performance of one or more vehicle services to one or more users. For example, a service entity can offer vehicle service(s) to users via one or more software applications (e.g., on a user computing device), via a website, and/or via other types of interfaces that allow a user to request a vehicle service. As described herein, the vehicle services can include transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services. The service entity can utilize an operations computing system to coordinate the provision of vehicle service(s) associated with the service entity.

A user can provide (e.g., via a user device) a request for a vehicle service to an operations computing system associated with the service entity. The request can indicate the type of vehicle service that the user desires (e.g., a transportation service, a delivery service, a courier service, etc.), a number of user(s) to be transported, a number and/or other characteristics (e.g., size, shape, type, etc.) of item(s) to be transported, one or more locations (e.g., an origin location, a destination location, etc.), timing constraints (e.g., pick-up time, drop-off time, deadlines, etc.), service parameters (e.g., a need for handicap access, a need for trunk space, etc.), and/or other information. The operations computing system of the service entity can process the request and identify one or more autonomous vehicles that may be able to perform the requested vehicle services for the user. The operations computing system can send a service assignment indicative of the requested vehicle services to an autonomous vehicle (e.g., via the service entity's computing platform).

In some implementations, the vehicle computing system can pool service assignments to concurrently perform vehicle services. For instance, an autonomous vehicle can accept a service assignment to transport a first group of user(s) (and any associated item(s)) to a destination location. The vehicle computing system can determine whether the autonomous vehicle may be available to perform another vehicle service concurrently with that transportation service. For example, based on the vehicle's available capacity and/or other data (e.g., pick-up location, delivery location, potential travel route, etc.), the autonomous vehicle can determine whether it can accept another service assignment. If so, the autonomous vehicle can accept another service assignment such as, for example, an assignment to transport a second group of user(s) (and any associated item(s)) to another destination location.

The technology of the present disclosure can improve an autonomous vehicle's ability to accommodate for a variety of service assignments as well as potential vehicle service pooling through the use of an automatically adjustable partition wall. For instance, the autonomous vehicle can include a main body. The main body of the vehicle can include walls, a floor, and a ceiling. The walls, the floor, and the ceiling can define an interior cabin of the autonomous vehicle. The autonomous vehicle can include a partition wall that is movable within the interior cabin of the autonomous vehicle. The partition wall can move substantially along a longitudinal direction (e.g., extending through the front and the rear of the vehicle). For instance, the partition wall can be movably connected to rails, wheels, magnets, and/or other mechanism(s) that allow the partition wall to slide, glide, slip, and/or otherwise move between multiple positions within the interior cabin of the autonomous vehicle (e.g., a first position, a second position, a third position, etc.) along a path that is substantially parallel to the longitudinal direction. The partition wall can substantially extend between the floor and the ceiling in a direction that is perpendicular to the longitudinal direction. For example, the partition wall can extend in a vertical direction (e.g., extending through the top and the bottom of the vehicle) and a traverse direction (e.g., extending through the left and the right sides of the vehicle). Additionally, or alternatively, one or more portions of the partition wall can move in the traverse and/or vertical direction.

The partition wall can be communicatively connected to a wall control system that is configured to automatically control the movement of the partition wall. For instance, the wall control system can be communicatively connected to a mechanical and/or electrical control device (e.g., a motor, servo, air compressor, hydraulic, pneumatic, and/or some other mechanical control device) that can physically move the partition wall. In this way, the partition wall can be automatically adjusted onboard the autonomous vehicle without human user interaction and without the vehicle going to a service depot (e.g., to allow a technician to adjust the interior configuration of the vehicle).

The partition wall can help create and/or separate different compartments within the interior cabin of the autonomous vehicle. For instance, the interior cabin can include at least a first compartment and a second compartment. In some implementations, one of the compartments can be utilized for transporting riders and one of the compartments can be utilized for transporting items. In some implementations, the compartments can be used to transport separate groups of users (e.g., a first group of user(s) in the first compartment, a second group of user(s) in the second compartment, etc.) or to transport separate groups of items (e.g., a first group of item(s) in the first compartment, a second group of item(s) in the second compartment, etc.). The partition wall can include a first side and a second side that is opposite the first side. The first side can at least partially define the first compartment of the interior cabin and the second side can at least partially define the second compartment of the interior cabin. This can allow the partition wall to provide a physical barrier between the compartments.

The autonomous vehicle can include one or more seats located within the interior of the autonomous vehicle. The seat(s) can be retractable so that the autonomous vehicle can provide various seating and/or storage configurations within the interior cabin. For instance, the seat(s) can be retractable into the floor of the autonomous vehicle such that the seat(s) are not exposed within the interior cabin. For example, the seat(s) can move from an extended position where the seat(s) are exposed in the interior cabin to a stowed position in a floor storage compartment that is located underneath the floor of the autonomous vehicle, and vice versa. In some implementations, the seat(s) can be movably coupled to the partition wall (e.g., via rail(s), wheel(s), magnet(s), etc.) so that the seat(s) can move in the vertical direction (e.g., from the extended position to the stowed position). In some implementations, the seat(s) can be movably coupled to the floor (e.g., via mechanical arm(s), rail(s), adjustable truss(es), etc.) so that the seats can move from the extended position to the stowed position, and vice verse. The seat(s) can be communicatively coupled to a seat control system that is configured to automatically adjust the position of the seat(s). The seat control system can be connected to a mechanical and/or electrical control device (e.g., a motor, servo, air compressor, hydraulic, pneumatic, and/or some other mechanical control device) that can physically move the seat(s). One or more portions of the wall control system and the seat control system can be implemented in the same system or separate from one another.

In some implementations, the seat(s) can be retractable to allow for the movement of the partition wall within the interior cabin of the autonomous vehicle. For instance, as described herein, the partition wall can be movable between a first position and a second position along a path (e.g., defined by a mechanical rail system). While in the extended position, the seat(s) may prevent the partition wall from moving between the first and second position(s) (e.g., by physically blocking the wall's path). Accordingly, the seat(s) can be retracted into the stowed position so that the partition wall is able to move along the path between the first and second position(s).

In some implementations, the partition wall can include a visual output device. The visual output device can include a display device such as, for example, smart glass technology, a display screen, CRT, LCD, plasma screen, touch screen, TV, projector, other types of display devices and/or a combination thereof. The visual output device can be configured to display various information for a user that is onboard the autonomous vehicle. For example, the display device can present a user interface that is indicative of the location of the autonomous vehicle within a geographic area, proximity of the autonomous vehicle to a destination location, media content (e.g., movies, shows, games, etc.), information associated with a destination location (e.g., weather information, flight information, etc.), traffic information, event information, and/or any other information. In some implementations, the vehicle computing system can control what content is displayed via the visual output device. The partition wall can also, or alternatively, include other output devices (e.g., audio output devices, etc.).

The vehicle computing system of the autonomous vehicle can be configured to automatically adjust the partition wall and/or the seat(s) to accommodate for various service assignment(s). For instance, the vehicle computing system can obtain data indicative of one or more service assignments associated with the autonomous vehicle. As described herein, the service assignment(s) can be indicative of a variety of information associated with the requested vehicle service. The vehicle computing system can determine a position of the partition wall within the interior cabin of the autonomous vehicle based at least in part on the service assignment(s) (e.g., the information indicated therein). For instance, the vehicle computing system can process the data indicative of the service assignment(s) to determine the associated service parameters (e.g., number of user(s)/item(s), special accommodations, etc.). The vehicle computing system can access a data structure (e.g., table, list, etc.) that is indicative of various pre-determined wall positions corresponding to various service assignment parameters. The data structure can include, for example, wall position data that indicates where the partition wall should be positioned for a certain number of user(s), a certain number/type of item(s), certain special parameters (e.g., wheel chair accommodations), etc. The vehicle computing system can determine the position of the partition wall based at least in part on the parameters associated with the service assignment and the wall position data by traversing the data structure to find the appropriate wall position given the particular service assignment parameters.

Additionally, or alternatively, the vehicle computing system can determine a seat adjustment of the seat(s) within the interior cabin of the autonomous vehicle based at least in part on the service assignment(s). For example, the vehicle computing system can access a data structure that is indicative of various pre-determined seat arrangements corresponding to various service assignment parameters. The data structure can include, for example, seat arrangement data that indicates how the seat(s) should be arranged for a certain number of user(s), a certain number/type of item(s), certain special parameters (e.g., wheel chair accommodations), etc. The vehicle computing system can determine the seat adjustment based at least in part on the parameters specified in the service assignment and the seat arrangement data by traversing the data structure to find the seat arrangement given the service assignment parameters.

The vehicle computing system can initiate the automatic adjustment of the partition wall and/or the seat(s) within the vehicle's interior cabin. By way of example, the service assignment can be indicative of a number of users (e.g., 4 users) and/or items (e.g., 2 backpacks, etc.) to be transported in the autonomous vehicle. The vehicle computing system can determine that the partition wall should be adjusted to a position such that a first compartment has enough space to accommodate the number of user(s) and that a second compartment has enough space to store the items. Moreover, the vehicle computing system can determine a seat adjustment based on the service assignment. For instance, the vehicle computing system can determine how the many seats are needed to accommodate the users (e.g., at least 2 seats for the 2 users) and/or whether any of the seats need to be retracted into a floor of the main body of the vehicle (e.g., to allow for movement of the partition wall, to allow for more storage space in the second compartment, etc.). In another example, the service assignment can indicate that a user with a wheel chair is to be transported by the autonomous vehicle. The vehicle computing system can determine a position for the partition wall within the interior cabin and/or a seat adjustment (e.g., to retract seat(s) into the floor, etc.) such that a first compartment has enough space to accommodate the user's wheel chair. The vehicle computing system can communicate signals (e.g., to the wall/seat control systems) to initiate an adjustment of the position of the wall and/or the seat adjustment. The signals can be indicative of the position to which the wall is to be adjusted and/or the seat adjustment. The wall and/or seat control system(s) can automatically adjust the partition wall and the seat(s) accordingly. When the partition wall reaches the determined position the partition wall can be locked into position via a locking system (e.g., a lock pin, teeth, grooves, tabs, slots, latching mechanisms, etc.) configured to temporarily secure the partition wall in place. Similar such mechanisms can be utilized for securing the seat(s) in a particular position.

In some implementations, the vehicle computing system can adjust the partition wall and/or seat(s) based on a plurality of service assignments. For instance, the vehicle computing system can obtain data indicative of a first service assignment associated with a first vehicle service. This can include, for example, a request to transport a first group of users to a first destination location (e.g., a restaurant). The vehicle computing system can determine that the autonomous vehicle has enough capacity to accept another service assignment (e.g., to pool vehicle services). The vehicle computing system can obtain data indicative of a second service assignment associated with a second vehicle service. This can include, for example, a request to transport a second group of users to a second destination location (e.g., a stadium). The vehicle computing system can determine a position of the partition wall and/or a seat adjustment of the seat(s) based at least in part on the first service assignment and the second service assignment such that the autonomous vehicle is able to perform the first vehicle service concurrently with the second vehicle service. For example, the vehicle computing system can determine a position of the partition wall (and/or a seat adjustment) that allows a first compartment to accommodate the first group of users and a second compartment to accommodate the second group of users such that the first and second groups can ride within the autonomous vehicle at the same time. The vehicle computing system can communicate signals to adjust the partition wall and/or the seats according to the determined wall position and/or seat adjustment.

The vehicle computing system can cause the autonomous vehicle to initiate a motion control to travel to a location to pick-up user(s) and/or item(s). Before and/or while the autonomous vehicle is en route to the location, the vehicle computing system can adjust the partition wall and/or seat(s), as described herein. The adjustment of the partition wall and/or the seat adjustment can be completed before the autonomous vehicle arrives at the location. In this way, the autonomous vehicle can re-configure the vehicle's interior to accommodate the user(s) and/or the item(s) for transportation before the user(s) and/or the item(s) are onboard the autonomous vehicle.

Although example implementations are described herein with respect to the autonomous vehicle having one partition wall, this is not meant to be limiting. An autonomous vehicle can have a plurality of partition walls within the interior cabin of the autonomous vehicle. The plurality of partition walls can help to create/define more than two compartments within the autonomous vehicle (e.g., a first compartment for user(s), a second compartment for user(s), a third compartment for item(s), etc.).

The systems and methods described herein provide a number of technical effects and benefits. For instance, the technology of the present disclosure provides an autonomous vehicle with a more flexible infrastructure that can help the vehicle better accommodate for a variety of service assignments as well as potential pooling of service assignments. This can allow the autonomous vehicle to better preserve its onboard resources (e.g., processing, memory, power, etc.). For instance, when it is not addressing a service assignment/performing a vehicle service, an autonomous vehicle can be in an idle state. However, even in the idle state, an autonomous vehicle can continue to acquire sensor data to remain cognizant of its environment (e.g., whether the vehicle is parked, moving, etc.). This can cause the autonomous vehicle to waste its processing, data storage, and power resources while it is not performing a vehicle service. However, by allowing the autonomous vehicle to re-configure its interior, the autonomous vehicle can accept more (and various types of) service assignments and provide a greater number of vehicle services leading to a reduction in idle time. Accordingly, the autonomous vehicle can more efficiently utilize its onboard computational and power resources to provide vehicle services as opposed to operating in an idle state.

The systems and methods of the present disclosure can provide an improvement to vehicle computing technology, such as autonomous vehicle computing technology. For instance, the systems and methods improve the ability of the autonomous vehicle to re-configure its interior without utilizing its computational and power resources to travel to a service depot. By way of example, a computing system (e.g., a vehicle computing system) can obtain data indicative of one or more service assignments associated with an autonomous vehicle. The computing system can determine a position of a partition wall within an interior cabin of the autonomous vehicle based at least in part on the one or more service assignments. The computing system can determine a seat adjustment of one or more seats within the interior cabin of the autonomous vehicle based at least in part on the service assignment. The computing system can communicate signals to initiate an adjustment of the partition wall to the determined position within the interior cabin of the autonomous vehicle and/or to initiate the seat adjustment of the one or more seats within the interior cabin of the autonomous vehicle. In this way, the autonomous vehicle can automatically adjust its interior in real-time (as the vehicle is deployed) to meet the specific needs of the service assignment(s). This can allow the autonomous vehicle to avoid using its processing, memory, power, etc. resources to travel to a service depot for re-configuration (e.g., by a technician) for each service assignment. Ultimately, the autonomous vehicle can save its resources for more productive uses such as, for example, the provision of vehicle service(s).

With reference now to the FIGS., example embodiments of the present disclosure will be discussed in further detail. FIG. 1 illustrates an example vehicle computing system 100 according to example embodiments of the present disclosure. The vehicle computing system 100 can be associated with an autonomous vehicle 105. The vehicle computing system 100 can be located onboard (e.g., included on and/or within) the autonomous vehicle 105.

The autonomous vehicle 105 incorporating the vehicle computing system 100 can be various types of vehicles. For instance, the autonomous vehicle 105 can be a ground-based autonomous vehicle such as an autonomous car, autonomous truck, autonomous bus, etc. The autonomous vehicle 105 can be an air-based autonomous vehicle (e.g., airplane, helicopter, or other aircraft) or other types of vehicles (e.g., watercraft, etc.). The autonomous vehicle 105 can drive, navigate, operate, etc. with minimal and/or no interaction from a human operator (e.g., driver). In some implementations, a human operator can be omitted from the autonomous vehicle 105 (and/or also omitted from remote control of the autonomous vehicle 105). In some implementations, a human operator can be included in the autonomous vehicle 105.

In some implementations, the autonomous vehicle 105 can be configured to operate in a plurality of operating modes. The autonomous vehicle 105 can be configured to operate in a fully autonomous (e.g., self-driving) operating mode in which the autonomous vehicle 105 is controllable without user input (e.g., can drive and navigate with no input from a human operator present in the autonomous vehicle 105 and/or remote from the autonomous vehicle 105). The autonomous vehicle 105 can operate in a semi-autonomous operating mode in which the autonomous vehicle 105 can operate with some input from a human operator present in the autonomous vehicle 105 (and/or a human operator that is remote from the autonomous vehicle 105). The autonomous vehicle 105 can enter into a manual operating mode in which the autonomous vehicle 105 is fully controllable by a human operator (e.g., human driver, pilot, etc.) and can be prohibited and/or disabled (e.g., temporary, permanently, etc.) from performing autonomous navigation (e.g., autonomous driving). In some implementations, the autonomous vehicle 105 can implement vehicle operating assistance technology (e.g., collision mitigation system, power assist steering, etc.) while in the manual operating mode to help assist the human operator of the autonomous vehicle 105.

The operating modes of the autonomous vehicle 105 can be stored in a memory onboard the autonomous vehicle 105. For example, the operating modes can be defined by an operating mode data structure (e.g., rule, list, table, etc.) that indicates one or more operating parameters for the autonomous vehicle 105, while in the particular operating mode. For example, an operating mode data structure can indicate that the autonomous vehicle 105 is to autonomously plan its motion when in the fully autonomous operating mode. The vehicle computing system 100 can access the memory when implementing an operating mode.

The operating mode of the autonomous vehicle 105 can be adjusted in a variety of manners. For example, the operating mode of the autonomous vehicle 105 can be selected remotely, off-board the autonomous vehicle 105. For example, a remote computing system (e.g., of a vehicle provider and/or service entity associated with the autonomous vehicle 105) can communicate data to the autonomous vehicle 105 instructing the autonomous vehicle 105 to enter into, exit from, maintain, etc. an operating mode. By way of example, such data can instruct the autonomous vehicle 105 to enter into the fully autonomous operating mode. In some implementations, the operating mode of the autonomous vehicle 105 can be set onboard and/or near the autonomous vehicle 105. For example, the vehicle computing system 100 can automatically determine when and where the autonomous vehicle 105 is to enter, change, maintain, etc. a particular operating mode (e.g., without user input). Additionally, or alternatively, the operating mode of the autonomous vehicle 105 can be manually selected via one or more interfaces located onboard the autonomous vehicle 105 (e.g., key switch, button, etc.) and/or associated with a computing device proximate to the autonomous vehicle 105 (e.g., a tablet operated by authorized personnel located near the autonomous vehicle 105). In some implementations, the operating mode of the autonomous vehicle 105 can be adjusted by manipulating a series of interfaces in a particular order to cause the autonomous vehicle 105 to enter into a particular operating mode.

The vehicle computing system 100 can include one or more computing devices located onboard the autonomous vehicle 105. For example, the computing device(s) can be located on and/or within the autonomous vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous vehicle 105 (e.g., its computing system, one or more processors, etc.) to perform operations and functions, such as those described herein for determining a position of a partition wall and/or seats, adjusting the partition wall and/or seats, controlling the autonomous vehicle to perform vehicle service(s), etc.

The autonomous vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the autonomous vehicle 105 over one or more networks (e.g., via one or more wireless signal connections). For example, the communications system 120 can allow the autonomous vehicle to send and receive data from an operations computing system 200 of a service entity. In some implementations, the communications system 120 can allow communication among one or more of the system(s) on-board the autonomous vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the autonomous vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the autonomous vehicle 105. For instance, the sensor data 140 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The autonomous vehicle 105 can include other sensors configured to acquire data associated with the autonomous vehicle 105. For example, the autonomous vehicle 105 can include inertial measurement unit(s), and/or other sensors.

The autonomous vehicle 105 can include one or more vehicle sensor(s) 125 that can be configured to acquire sensor data 140 associated with interior of the autonomous vehicle 105. For example, the sensor data 140 can indicate a configuration of the interior of the autonomous vehicle 105. For instance, the sensor data 140 can indicate the position of one or more partition walls located within the interior of the autonomous vehicle 105. In addition, or alternatively, the sensor data 140 can indicate the position of one or more seats within the interior of the autonomous vehicle 105. For example, the sensor data 140 can indicate which side of a partition wall each seat is located.

In some implementations, the sensor data 140 can be indicative of one or more objects within the surrounding environment of the autonomous vehicle 105. The object(s) can include, for example, vehicles, pedestrians, bicycles, and/or other objects. The object(s) can be located in front of, to the rear of, to the side of the autonomous vehicle 105, etc. The sensor data 140 can be indicative of locations associated with the object(s) within the surrounding environment of the autonomous vehicle 105 at one or more times. The vehicle sensor(s) 125 can communicate (e.g., transmit, send, make available, etc.) the sensor data 140 to the autonomy computing system 130.

In addition to the sensor data 140, the autonomy computing system 130 can retrieve or otherwise obtain map data 145. The map data 145 can provide information about the surrounding environment of the autonomous vehicle 105. In some implementations, an autonomous vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the autonomous vehicle 105 in comprehending and perceiving its surrounding environment and its relationship thereto. In some implementations, the vehicle computing system 100 can determine a vehicle route for the autonomous vehicle 105 based at least in part on the map data 145.

The autonomous vehicle 105 can include a positioning system 150. The positioning system 150 can determine a current position of the autonomous vehicle 105. The positioning system 150 can be any device or circuitry for analyzing the position of the autonomous vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the autonomous vehicle 105 can be used by various systems of the vehicle computing system 100 and/or provided to a remote computing system. For example, the map data 145 can provide the autonomous vehicle 105 relative positions of the elements of a surrounding environment of the autonomous vehicle 105. The autonomous vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the autonomous vehicle 105 and determine a motion plan for controlling the motion of the autonomous vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the autonomous vehicle 105 according to the motion plan.

The vehicle computing system 100 (e.g., the autonomy computing system 130) can identify one or more objects that are proximate to the autonomous vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the autonomous vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160 (and/or the motion planning system 165).

The prediction system 160 can be configured to predict a motion of the object(s) within the surrounding environment of the autonomous vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the autonomous vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the autonomous vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the autonomous vehicle 105 can perform a certain action (e.g., pass an object, etc.) without increasing the potential risk to the autonomous vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the autonomous vehicle 105 (e.g., due to an overriding factor). In some implementations, the motion plan 180 may define the vehicle's motion such that the autonomous vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the autonomous vehicle 105 (e.g., multiple times per second). Each new motion plan can describe a motion of the autonomous vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the autonomous vehicle 105.

The vehicle computing system 100 can cause the autonomous vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the autonomous vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the autonomous vehicle 105 to autonomously travel within the vehicle's surrounding environment.

The autonomous vehicle 105 can include a wall control system 185 communicatively coupled to a partition wall (e.g., shown in FIGS. 3-6). The wall control system 185 can be configured to automatically control the movement of the partition wall. For instance, the wall control system 185 can be communicatively connected to a mechanical and/or electrical control device (e.g., a motor, servo, air compressor, hydraulic, pneumatic, and/or some other mechanical control device) that can physically move the partition wall 305. In this way, the wall control system 185 can automatically adjust the partition wall onboard the autonomous vehicle 105 without human user interaction and without the vehicle going to a service depot (e.g., to allow a technician to adjust the interior configuration of the vehicle).

The autonomous vehicle 105 can include a seat control system 195 communicatively coupled to one or more seats within the interior of the autonomous vehicle 105. The seat control system 195 can be connected to a mechanical and/or electrical control device (e.g., a motor, servo, air compressor, hydraulic, pneumatic, and/or some other mechanical control device) that can physically move the seat(s). One or more portions of the wall control system 185 and the seat control system 195 can be implemented in the same system or separate from one another.

The autonomous vehicle 105 can include an HMI ("Human Machine Interface") 190 that can output data for and accept input from a user of the autonomous vehicle 105. The HMI 190 can include one or more output devices such as display devices, speakers, tactile devices, etc. For instance, the autonomous vehicle 105 can include a plurality of display devices. The display devices can include smart glass technology, a display screen, CRT, LCD, plasma screen, touch screen, TV, projector, other types of display devices and/or a combination thereof. One or more of the display devices can be included in a user device (e.g., personal computer, tablet, mobile phone, etc.).

The plurality of display devices can include a first display device and a second display device. The first display device can be associated with the exterior of the autonomous vehicle 105. The first display device can be located on an exterior surface and/or other structure, of the autonomous vehicle 105 and/or configured such that a user can view and/or interact with the first display device (and/or a user interface rendered thereon) from the exterior of the autonomous vehicle. For example, one or more windows of the autonomous vehicle 105 can include smart glass technology that can perform as the first display device. The second display device can be associated with the interior of the autonomous vehicle 105. The second display device can be located on an interior surface and/or other structure (e.g., seat, partition, etc.) of the autonomous vehicle 105 and/or configured such that a user can view and/or interact with the second display device (and/or a user interface rendered thereon) from the interior of the autonomous vehicle 105. For example, one or more partitions located within the interior of the autonomous vehicle 105 can include the second display device. For instance, the one or more of the partitions can include smart glass technology that can perform as the second display device.

The autonomous vehicle 105 can be associated with a variety of different parties. In some implementations, the autonomous vehicle 105 can be associated with a vehicle provider. The vehicle provider can include, for example, an owner, a manufacturer, a vendor, a manager, a coordinator, a handler, etc. of the autonomous vehicle 105. The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system that is remote from the autonomous vehicle 105 to communicate (e.g., over one or more wireless communication channels) with the vehicle computing system 100 of the autonomous vehicle 105. The vehicle provider computing system can include a server system (e.g., of an entity), a user device (e.g., of an individual owner), and/or other types of computing systems.

The autonomous vehicle 105 can be configured to perform vehicle services for one or more service entities. An autonomous vehicle 105 can perform a vehicle service by, for example and as further described herein, travelling (e.g., traveling autonomously) to a location associated with a requested vehicle service, allowing user(s) and/or item(s) to board or otherwise enter the autonomous vehicle 105, transporting the user(s) and/or item(s), allowing the user(s) and/or item(s) to deboard or otherwise exit the autonomous vehicle 105, etc. In this way, the autonomous vehicle 105 can provide the vehicle service(s) for a service entity to a user.

A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services.

Each service entity can be associated with a respective telecommunications network system of that service entity. A telecommunications network system can include the infrastructure to facilitate communication between the autonomous vehicle 105 and the various computing systems of the associated service entity that are remote from the autonomous vehicle 105. For example, a service entity can utilize an operations computing system 200 to communicate with, coordinate, manage, etc. autonomous vehicle(s) to perform the vehicle services of the service entity. A telecommunications network system can allow an autonomous vehicle 105 to utilize the back-end functionality of the respective operations computing system 200 (e.g., service assignment allocation, vehicle technical support, etc.).

An operations computing system 200 can include one or more computing devices that are remote from the autonomous vehicle 105 (e.g., located off-board the autonomous vehicle 105). For example, such computing device(s) can be components of a cloud-based server system and/or other type of computing system that can communicate with the vehicle computing system 100 of the autonomous vehicle 105, another computing system (e.g., a vehicle provider computing system 250, etc.), a user device, etc. The operations computing system 200 can be or otherwise included in a data center for the service entity, for example. The operations computing system can be distributed across one or more location(s) and include one or more sub-systems. The computing device(s) of an operations computing system 200 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system (e.g., the one or more processors, etc.) to perform operations and functions, such as communicating data to and/or obtaining data from user device(s), vehicle(s), etc.

In some implementations, the operations computing system 200 and the vehicle computing system 100 can indirectly communicate. For example, a vehicle provider computing system can serve as an intermediary between the operations computing system and the vehicle computing system 100 such that at least some data is communicated from the operations computing system 200 (or the vehicle computing system 100) to the vehicle provider computing system and then to the vehicle computing system 100 (or the operations computing system 200).

An operations computing system 200 can be configured to select and assign tasks to autonomous vehicles. FIG. 2 depicts the example operations computing system 200 according to example embodiments of the present disclosure. The operations computing system 200 can be associated with one or more service entities. The operations computing system 200 can include, for example, a vehicle service coordination system 205, and/or other systems.

The vehicle service coordination system 205 can be configured to coordinate the provision of one or more vehicle services to one or more users 210. For instance, the operations computing system 200 can include a request interface 215. The request interface 215 can allow the operations computing system 200 to communicate with one or a plurality of user devices 220 (e.g., mobile phones, desktops, laptops, tablets, game systems, etc.). The request interface 215 can allow the operations computing system 200 and the user device(s) 220 to communicate data to and/or from one another. For example, the user device(s) 220 can communicate (e.g., via the request interface 215) data indicative of a service request 225 for a vehicle service to an operations computing system 200 associated with a service entity.

The vehicle service coordination system 205 can be configured to generate a service assignment 230. A service assignment 230 can be indicative of a vehicle service (e.g., requested by a user via the user device(s) 220) to be performed by a vehicle (e.g., an autonomous vehicle). A service assignment 230 can include a variety of information associated with the vehicle service, the requesting user, the user device, the service entity, etc. For example, a service assignment 230 can include data indicative of an associated user and/or user device (if permitted), data indicative of a compensation parameter (e.g., the compensation for delivering an item to a user, couriering an item for a user, transporting a user, etc.), data indicative of one or more locations (e.g., origin location, destination location, intermediate location, etc.), data indicative of a type of vehicle service (e.g., transportation service, delivery service, courier service, etc.), data indicative of the type of cargo for the vehicle service (e.g., passengers, luggage, packages, food, time-sensitive mail, etc.), data indicative of a vehicle type/size (e.g., sedan, sport utility vehicle, luxury vehicle, etc.), data indicative of one or more time constraints (e.g., pick-up times, drop-off times, time limits for delivery, service duration, etc.), data indicative of user preferences (e.g., music, temperature, etc.), data indicative of one or more vehicle service parameters (e.g., luggage types, handle-with-care instructions, special pick-up requests, etc.), data indicative of the special accommodations (e.g., wheelchairs, handicapped users, etc.), data indicative of user ratings, data indicative of one or more vehicle service incentives (e.g., increased compensation, increased ratings, priority treatment, etc.), and/or other types of data.

The operations computing system 200 (e.g., the vehicle service coordination system 205) can identify one or more autonomous vehicles that are available for a service assignment 230. The vehicle service coordination system 205 can identify autonomous vehicle(s) that are online with the service entity associated with the operations computing system 200. The vehicle service coordination system 205 can select an autonomous vehicle for the service assignment 230 based at least in part on the data indicated in the service assignment 230. For example, the vehicle service coordination system 205 can select an autonomous vehicle that meets the preferences of the user, has the necessary capacity, is the requested vehicle type, etc. Additionally, or alternatively, the vehicle service coordination system 205 can select an autonomous vehicle based at least in part on the current and/or future location of the autonomous vehicle. For example, the vehicle service coordination system 205 can select an autonomous vehicle that is proximate to an origin location associated with the service assignment 230. Additionally, or alternatively, the vehicle service coordination system 205 can select an autonomous vehicle that is within and/or nearby a geographic area that includes the origin location and/or destination location of the service assignment 230.

The operations computing system 200 can utilize a vehicle interface 235 to communicate data indicative of a service assignment 230 to one or more vehicle computing systems 240 of one or more autonomous vehicles 245. The vehicle computing system(s) 240 can include the vehicle computing system 100 and/or be configured in similar manner (e.g., as shown in FIG. 1) and the autonomous vehicle(s) 245 can include the autonomous vehicle 105. The vehicle interface 235 can allow the operations computing system 200 and one or a plurality of vehicle computing systems 240 (e.g., of one or a plurality of autonomous vehicles 245) to communicate data to and/or from one another. For example, the operations computing system 200 can communicate, via the vehicle interface 235, data indicative of a service assignment 230 to one or more vehicle computing system(s) 240 of the autonomous vehicles 245 that the operations computing system 200 selects for the service assignment 230. Additionally, or alternatively, the vehicle computing system(s) 240 can communicate data associated with the autonomous vehicle(s) 245 to the operations computing system 200. In this way, the operations computing system 200 can coordinate the performance of vehicle service(s) for user(s) by the autonomous vehicle(s) 245 as well as monitor the autonomous vehicle(s) 245. The autonomous vehicle(s) 245 can include and/or be configured in the same or a similar manner to the autonomous vehicle 105 shown in FIG. 1.

In some implementations, the operations computing system 200 can select a non-autonomous vehicle (e.g., human driven vehicle) for a service assignment 230. For example, the vehicle service coordination system 205 can select a non-autonomous vehicle that is proximate to a location associated with the service assignment 230. Additionally, or alternatively, the vehicle service coordination system 205 can select a non-autonomous vehicle that is within and/or nearby a geographic area that includes the origin location and/or destination location of the service assignment 230. The operations computing system 200 can communicate data indicative of a service assignment 230 to one or more computing devices associated with the selected non-autonomous vehicle (e.g., a user device of the vehicle operator). The service assignment 230 can be indicative of a request that the operator provide the requested vehicle service to a user associated with the service assignment 230.

In some implementations, the operations computing system 200 can communicate with one or more vehicle provider computing systems 250 (associated with one or more vehicle providers) via a vehicle provider interface 255. The vehicle provider computing system(s) 250 can be associated with vehicle provider(s) that are associated with the autonomous vehicle(s) 245. A vehicle provider can include, for example, an owner, a manufacturer, a vendor, a manager, a coordinator, a handler, etc. of the autonomous vehicle 105 (e.g., a third party, etc.). The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system 250 that is remote from the autonomous vehicle 105 to communicate (e.g., over one or more wireless communication channels) with the vehicle computing system(s) 240 of one or more autonomous vehicles 245. A vehicle provider computing system 250 can include a server system (e.g., of an entity), a user device (e.g., of an individual owner), and/or other types of computing systems.

The vehicle provider interface 255 can allow the operations computing system 200 and one or a plurality of vehicle provider computing systems 250 (e.g., of one or more vehicle providers, etc.) to communicate data to and/or from one another. For example, the operations computing system 200 can communicate, via the vehicle provider interface 255, data indicative of a service assignment 230, and/or other data as described herein, to one or more vehicle provider computing system(s) 250. The vehicle provider computing system(s) 250 can then communicate such data to the vehicle computing system(s) 240. Additionally, or alternatively, the vehicle provider computing system(s) 250 can communicate data associated with one or more autonomous vehicles 245 (and/or other data) to the operations computing system 200.

A service entity may have varying levels of control over the vehicle(s) that perform its vehicle services. In some implementations, a vehicle can be included in the service entity's dedicated supply of vehicles. The dedicated supply can include vehicles that are owned, leased, or otherwise exclusively available to the service entity (e.g., for the provision of its vehicle service(s), other tasks, etc.) for at least some period of time. This can include, for example, an autonomous vehicle 245 that is associated with a vehicle provider, but that is online only with that service entity (e.g., available to accept service assignments for only that service entity, etc.) for a certain time period (e.g., a few hours, a day, week, etc.).

In some implementations, a vehicle can be included in the service entity's non-dedicated supply of vehicles. This can include vehicles that are not exclusively available to the service entity. For example, an autonomous vehicle 245 that is currently online with two different service entities so that the autonomous vehicle 245 may accept service assignment(s) 230 from either service entity (e.g., from the operations computing systems associated therewith, etc.) may be considered to be part of a non-dedicated supply of autonomous vehicles. In some implementations, whether a vehicle is considered to be part of the dedicated supply or the non-dedicated supply can be based, for example, on an agreement between the service entity and a vehicle provider associated with the autonomous vehicle 245.

Returning to FIG. 1, an autonomous vehicle 105 can be configured to determine one or more interior compartments to accommodate for a given service assignment 230. Each of the compartments can be associated with a different purpose. For instance, the autonomous vehicle 105 can determine one compartment for a first group of users and another, separate compartment for a second group of users. To do so, the vehicle computing system 100 can adjust a position of one or more partition walls located within an interior cabin of the autonomous vehicle 105 based at least in part on the one or more service assignments.

Figure 3A:
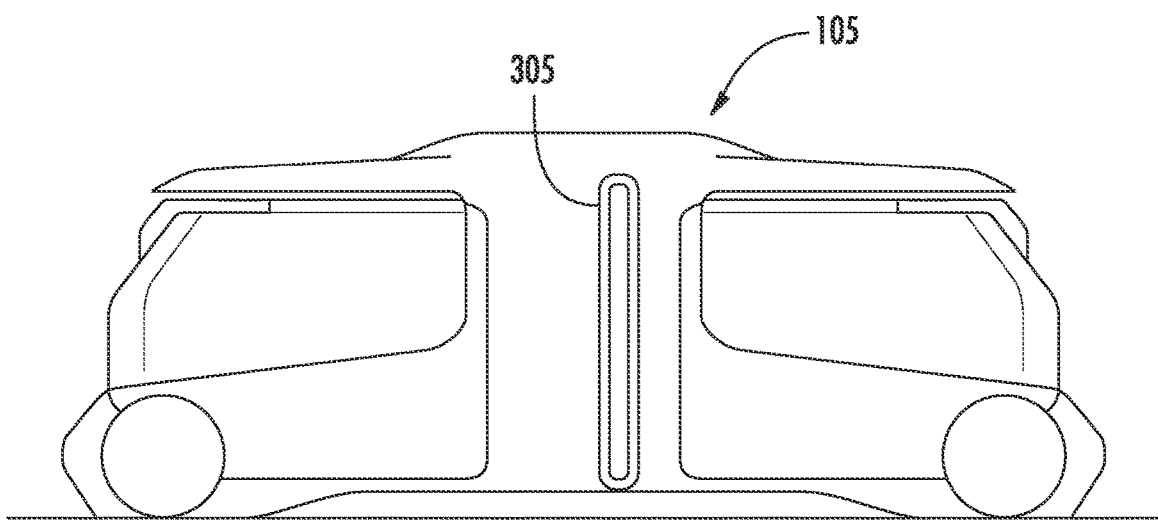
FIGS. 3A-B depict example diagrams of an autonomous vehicle with an automatic partition wall according to example implementations of the present disclosure.
Figure 3B:
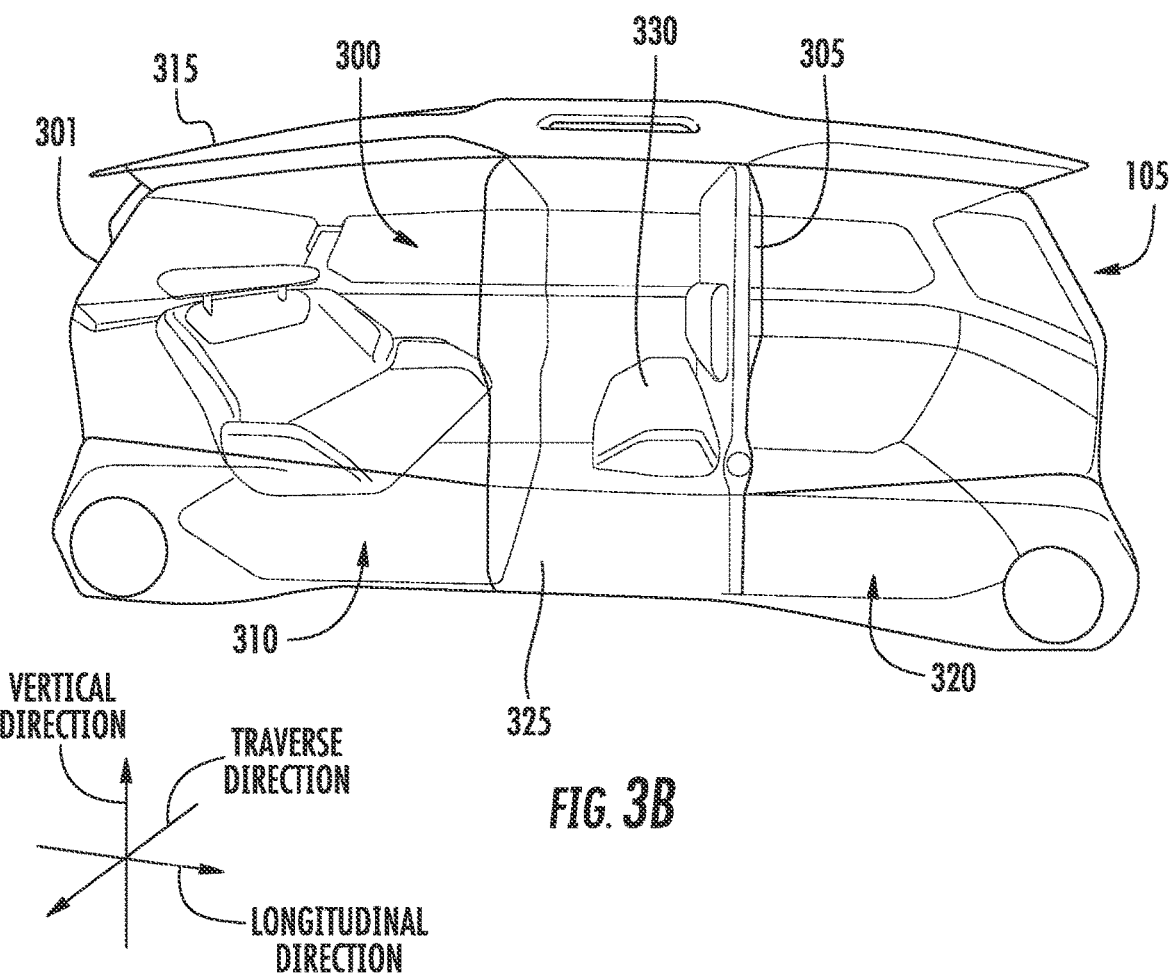

For example, FIGS. 3A-B depict example diagrams of an autonomous vehicle 105 with an automatic partition wall 305 according to example implementations of the present disclosure. For instance, the autonomous vehicle can include a main body 301 with an interior cabin 300. By way of example, the main body 301 of the autonomous vehicle 205 can include walls (e.g., side/front/rear walls, partition wall 305), a floor 325, and a ceiling 315. The walls, the floor 325, and the ceiling 315 can define the interior cabin 300 of the autonomous vehicle 105. The autonomous vehicle 105 can include a partition wall 305 that is movable within the interior cabin 300 of the autonomous vehicle 105. The partition wall 305 can move substantially along a longitudinal direction (e.g., extending through the front and the rear of the vehicle). For instance, the partition wall 305 can be movably connected to rails, wheels, magnets, and/or other mechanism(s) that allow the partition wall 305 to slide, glide, slip, and/or otherwise move between multiple positions within the interior cabin 300 of the autonomous vehicle 105 (e.g., a first position, a second position, a third position, etc.) along a path that is substantially parallel to the longitudinal direction. The partition wall 305 can extend between the floor 325 and the ceiling 315 in a direction that is perpendicular to the longitudinal direction. For example, the partition wall 305 can extend in a vertical direction (e.g., extending through the top and the bottom of the vehicle) and a traverse direction (e.g., extending through the left and the right sides of the vehicle).

Additionally, or alternatively, one or more portions of the partition wall 305 can move in the traverse and/or vertical direction. For example, the partition wall 305 can rotate clockwise and/or counterclockwise around an axis that is parallel to the vertical direction and/or an axis that is parallel to the traverse direction. This can be done, for example, to allow for more leg room for a particular seat.

In some implementations, the partition wall 305 can extend a portion of the vertical distance between the floor 325 and the ceiling 315. For example, the partition wall 305 can extend halfway from the floor 325 (e.g., in the vertical direction) to create two compartments partially divided by the partition wall 305. In another example, the partition wall 305 can extend halfway from one side wall to the other (e.g., in the traverse direction) to create two compartments partially divided by the partition wall 305. In this manner, the partition wall 305 can create a partial barrier between the two compartments within the interior cabin 300 of the autonomous vehicle 105 without completely separating the compartments. Alternatively, or additionally, the partition wall 305 can extend the complete vertical distance between the floor 325 and the ceiling 315 (and the side wall to side wall in the traverse direction) to create two distinct compartments separated by the partition wall 305.

The partition wall 305 can help create and/or (e.g., partially, wholly, etc.) separate different compartments within the interior cabin 300 of the autonomous vehicle 105. For instance, the interior cabin 300 can include at least a first compartment 310 and a second compartment 320. In some implementations, one of the compartments (e.g., first compartment 310) can be utilized for transporting riders and one of the compartments (e.g., second compartment 320) can be utilized for transporting items. In some implementations, the compartments can be used to transport separate groups of users (e.g., a first group of user(s) in the first compartment 310, a second group of user(s) in the second compartment 320, etc.) or to transport separate groups of items (e.g., a first group of item(s) in the first compartment 310, a second group of item(s) in the second compartment 320, etc.). The partition wall 305 can include a first side and a second side that is opposite the first side, as shown in FIGS. 3A-B. The first side can at least partially define the first compartment 310 of interior cabin 300 and the second side can at least partially define the second compartment 320 of interior cabin 300. This can allow the partition wall 305 to provide a partial and/or complete physical barrier between the compartments.

The partition wall 305 can be communicatively connected to the wall control system 185 that is configured to automatically control the movement of the partition wall 305. For instance, the wall control system 185 can be communicatively connected to a mechanical and/or electrical control device (e.g., a motor, servo, air compressor, hydraulic, pneumatic, and/or some other mechanical control device) that can physically move the partition wall 305. In this way, the partition wall 305 can be automatically adjusted onboard the autonomous vehicle 105 without human user interaction and without the vehicle going to a service depot (e.g., to allow a technician to adjust the interior configuration of the vehicle). In this manner, the vehicle control system 100 can automatically adjust its interior in real-time (as the vehicle is deployed) to meet the specific needs of one or more service assignments. Thus, the wall control system 185 can allow the autonomous vehicle 105 to avoid using its processing, memory, power, etc. resources to travel to the service depot for reconfiguration (e.g., by a technician) for each service assignment.

Figure 4A:
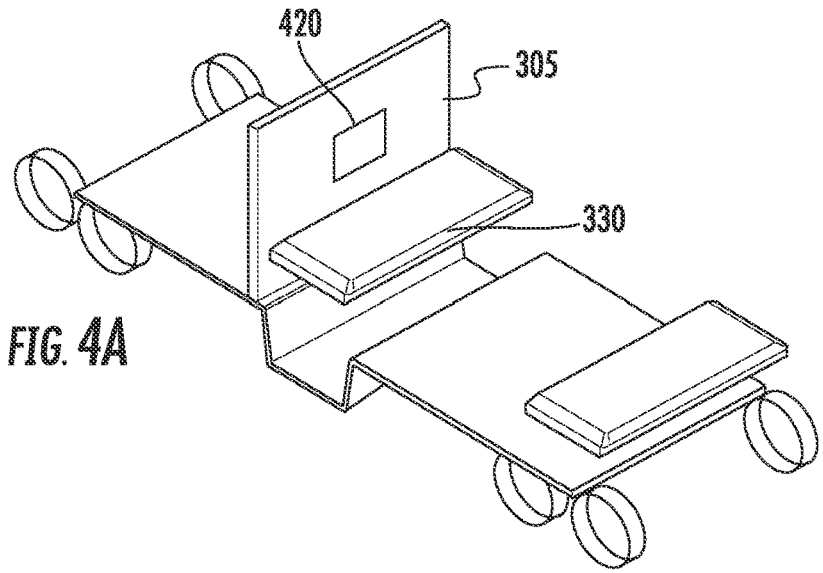
FIGS. 4A-C depict example perspective-view diagrams of an automatic partition wall at various positions according to example implementations of the present disclosure.
Figure 4B:
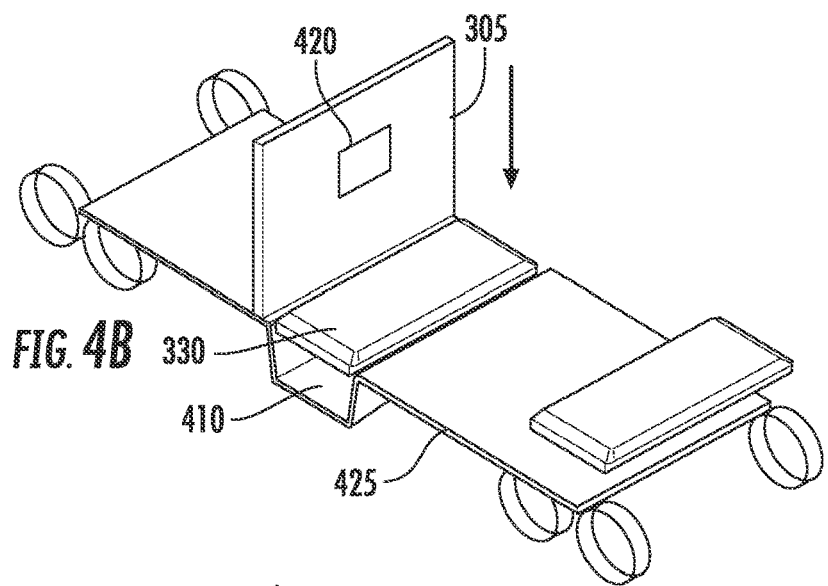

Turning to FIG. 4, FIGS. 4A-C depict example perspective diagrams of an automatic partition wall (e.g., partition wall 305) at various positions according to example implementations of the present disclosure. For example, the autonomous vehicle 105 can include one or more seats 330 located within the interior cabin 300 of the autonomous vehicle 105. The seat(s) 330 can be retractable so that the autonomous vehicle 105 can provide various seating and/or storage configurations within the interior cabin 300. For instance, as depicted in FIG. 4B, the seat(s) 330 can be retractable into the floor 325 of the autonomous vehicle 105 such that the seat(s) 330 are not exposed within the interior cabin 300. For example, the seat(s) 330 can move from an extended position where the seat(s) 330 are exposed in the interior cabin 300 (e.g., as in FIG. 4A) to a stowed position (e.g., as in FIG. 4B) in a floor storage compartment 410 that is located underneath the floor 325 of the autonomous vehicle 105, and vice versa. In some implementations, the seat(s) 330 can be movably coupled to the partition wall 305 (e.g., via rail(s), wheel(s), magnet(s), etc.) so that the seat(s) 330 can move in the vertical direction (e.g., from the extended position to the stowed position). In some implementations, the seat(s) 330 can be movably coupled to the floor 325 (e.g., via mechanical arm(s), rail(s), adjustable truss(es), etc.) so that the seats 330 can move from the extended position to the stowed position, and vice versa.

The seat(s) 330 can be communicatively coupled to a seat control system 195 that is configured to automatically adjust the position of the seat(s) 330. The seat control system 195 can be connected to a mechanical and/or electrical control device (e.g., a motor, servo, air compressor, hydraulic, pneumatic, and/or some other mechanical control device) that can physically move the seat(s) 330. In this manner, the seat control system 195 can allow the autonomous vehicle 105 to more efficiently utilize its onboard computational and power resources by re-configuring its interior to facilitate a wide range of vehicle services as opposed to operating in an idle state. One or more portions of the wall control system 185 and the seat control system 195 can be implemented in the same system or separate from one another.

Figure 4C:
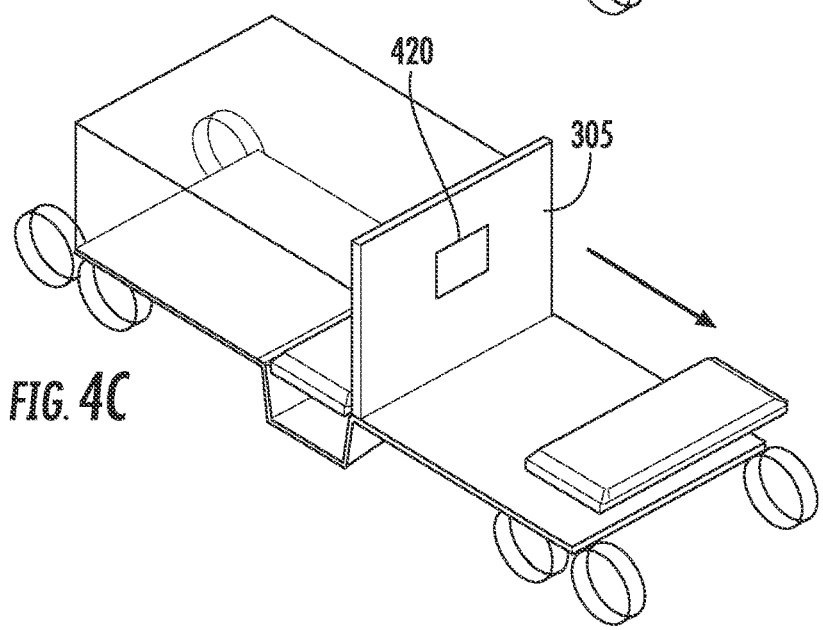

In some implementations, as illustrated by FIG. 4C, the seat(s) 330 can be retractable to allow for the movement of the partition wall 305 within the interior cabin 300 of the autonomous vehicle 105. For instance, the partition wall 305 can be movable between a first position (e.g., position in FIG. 4A) and a second position (e.g., position in FIG. 4C) along a path (e.g., defined by a mechanical rail system). While in the extended position, the seat(s) 330 may prevent the partition wall 305 from moving between the first and second position(s) (e.g., by physically blocking the wall's path). Accordingly, the seat(s) 330 can be retracted into the stowed position (e.g., into the floor compartment 410) so that the partition wall 305 is able to move along the path between the first and second position(s). In this manner, the vehicle computing system 100 of autonomous vehicle 105 can create one or more dynamic compartments depending on the needs of one or more users.

Figure 5B:
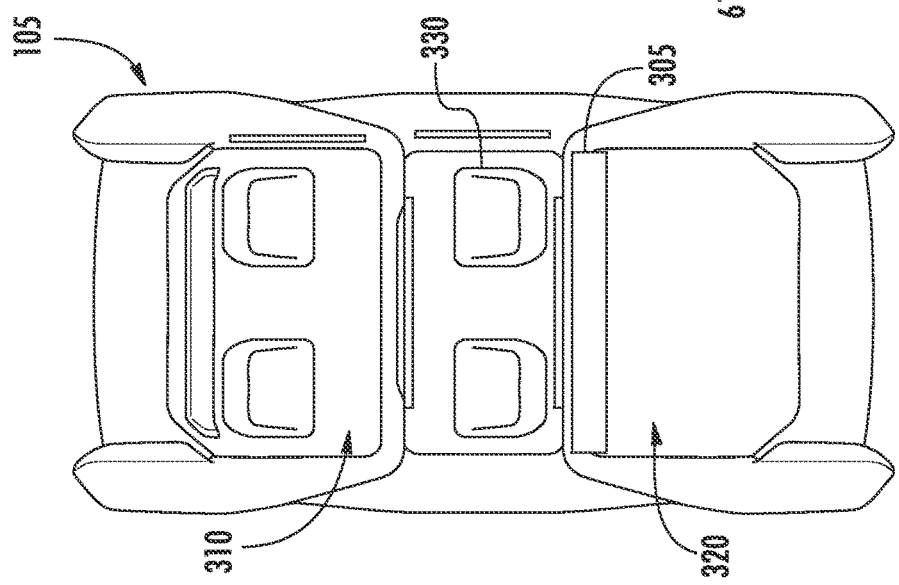
FIGS. 5A-B depict example overhead-view diagrams of an automatic partition wall at various positions according to example implementations of the present disclosure.
Figure 5A:
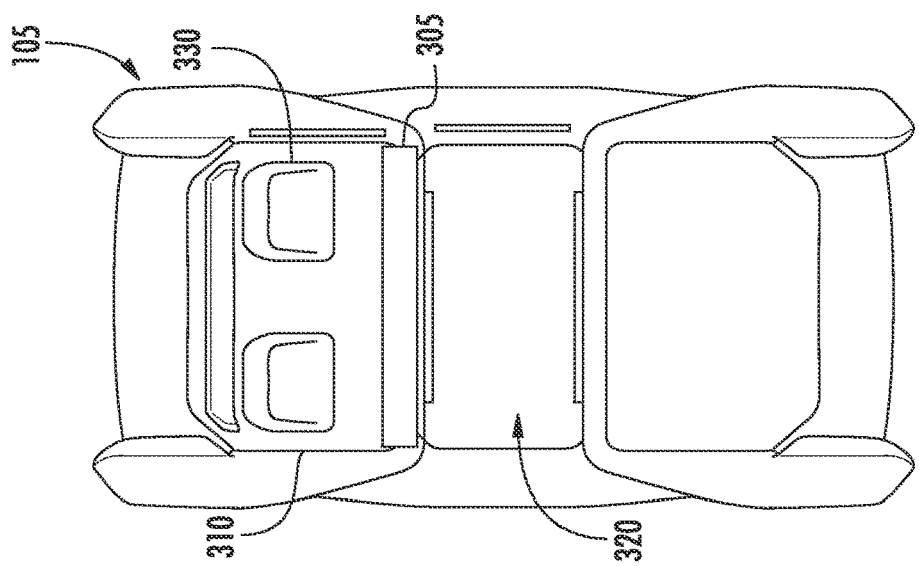

For illustration purposes, FIGS. 5A-B depict example overhead-view diagrams of an automatic partition wall (e.g., partition wall 305) at various positions according to example implementations of the present disclosure. The vehicle computing system 100 can adjust the partition wall 305 and one or more seat(s) 330 to create a first compartment 310 and/or a second compartment 320. In some implementations, the vehicle computing system 100 can determine one or more compartment configurations based at least in part on the purpose for each compartment. For instance, the first compartment 310 can include one or more seat(s) 330 in the extended position for the purpose of seating passengers. Additionally, or alternatively, the second compartment 320 can be configured for storage purposes and include one or more seats in the stowed position.

In some implementations, the vehicle computing system 100 of the autonomous vehicle 105 can be configured to automatically adjust the partition wall 305 and/or the seat(s) 330 to accommodate for various service assignment(s) 230. For instance, the vehicle computing system 100 can obtain data indicative of one or more service assignments 230 associated with the autonomous vehicle 105. As described herein, the service assignment(s) 230 can be indicative of a variety of information associated with a requested vehicle service. The vehicle computing system 100 can determine a position of the partition wall 305 within the interior cabin 300 of the autonomous vehicle 105 based at least in part on the service assignment(s) 230 (e.g., the information indicated therein).

For instance, the vehicle computing system 100 can process the data indicative of the service assignment(s) 230 to determine one or more associated service parameters. For example, the one or more service parameters can include a number of users and/or items to be transported, special accommodations such as one or more handicaps/requirements exhibited by the one or more users, user preferences, time constraints etc.

The vehicle computing system 100 can access a data structure (e.g., table, list, etc.) that is indicative of various pre-determined wall positions corresponding to various service assignment parameters. The data structure can include, for example, wall position data that indicates where the partition wall 305 should be positioned for a certain number of user(s), a certain number/type of item(s), certain special parameters (e.g., wheel chair accommodations), etc. The vehicle computing system 100 can determine the position of the partition wall 305 based at least in part on the parameters associated with the service assignment(s) 230 and the wall position data by traversing the data structure to find the appropriate wall position given the particular service assignment parameters.

Additionally, or alternatively, the vehicle computing system 100 can determine a seat adjustment of the seat(s) 330 within the interior cabin 300 of the autonomous vehicle 105 based at least in part on the service assignment(s) 230. For example, the vehicle computing system 100 can access a data structure that is indicative of various pre-determined seat arrangements corresponding to the various service assignment parameters. The data structure can include, for example, seat arrangement data that indicates how the seat(s) 330 should be arranged for a certain number of user(s), a certain number/type of item(s), certain special parameters (e.g., wheel chair accommodations), etc. The vehicle computing system 100 can determine the seat adjustment based at least in part on the parameters specified in the service assignment 230 and the seat arrangement data by traversing the data structure to find the seat arrangement given the service assignment parameters.

In some implementations, the vehicle computing system 100 can determine the position of the partition wall 305 and/or a seat adjustment of seat(s) 330 within the interior cabin 300 of autonomous vehicle 105 based, at least in part, on a priority level assigned to one or more of the service assignment parameters. For example, in some implementations, user preferences can be assigned a lower priority than certain special parameters such as wheel chair accommodations. For example, a first user of a service assignment can be associated with a preference for a large storage space while a second user of the service assignment can be associated with wheelchair accommodations. In some cases, the large storage space can remove space necessary to accommodate the second user requiring wheelchair accommodations. In such a case, the vehicle computing system 100 can prioritize the wheelchair accommodations over the first user's preference for large storage space. In this manner, the vehicle computing system 100 can configure the interior cabin 300 of the autonomous vehicle 105 based, at least in part, on priority associated with one or more service assignment parameters to accommodate one or more conflicting service assignment parameters.

The vehicle computing system 100 can initiate the automatic adjustment of the partition wall 305 and/or the seat(s) 330 within the vehicle's interior cabin 300. For example, the service assignment 230 can be indicative of a number of users and/or items to be transported in the autonomous vehicle 105. In response, the vehicle computing system 100 can determine that the partition wall 305 should be adjusted to a position such that a first compartment 310 has enough space to accommodate the number of user(s) and that a second compartment 320 has enough space to store the items. By way of example, the service assignment 230 can be indicative of four users with two backpacks. In such a case, the vehicle computing system 100 can determine that the partition wall 305 should be adjusted to create a first compartment 310 with enough space to accommodate the four users and a second compartment 320 with enough space to accommodate the two backpacks (e.g., as shown in FIG. 5B). In addition, or alternatively, the service assignment 230 can be indicative of a user preference for two seats 330. In such a case, the vehicle computing system 100 can initiate the automatic adjustment of the partition wall 305 to create at least one compartment with enough space to position two seats 330 (e.g., as shown in FIG. 5A). In this manner, the vehicle computing system 100 can determine dynamic compartments based on user preferences.

Moreover, the vehicle computing system 100 can determine a seat adjustment based on the service assignment 230. For instance, the vehicle computing system 100 can determine how many seats 330 are needed to accommodate the users and/or whether any of the seats need to be retracted into a floor 325 of the main body of the autonomous vehicle 105. For example, the service assignment may be indicative of two users. In response, the vehicle computing system 100 can determine a seat adjustment to allow for at least one seat 330 for each of the two users (e.g., two seat(s) 330). Additionally, or alternatively, the vehicle computing system 100 can determine one or more seats 330 need to be retracted, for example, to allow for movement of the partition wall 305, to allow for more storage space in the second compartment 320, etc.

In another example, the service assignment 230 can indicate one or more special request. For example, the service assignment 230 can indicate that a user with a wheel chair is to be transported by the autonomous vehicle 105. The vehicle computing system 100 can determine a position for the partition wall 305 within the interior cabin 300 and/or a seat adjustment (e.g., to retract seat(s) into the floor 325, etc.) such that a first compartment 310 has enough space to accommodate the user's wheel chair.

The vehicle computing system 100 can communicate one or more signals (e.g., to the wall/seat control systems 185/195) to initiate an adjustment of the position of the partition wall 305 and/or a seat adjustment. The signal(s) can be indicative of the position to which the partition wall 305 is to be adjusted and/or the seat adjustment (e.g., the position, orientation, configuration, etc. to the seat(s) 330 are to be adjusted). The wall and/or seat control system(s) 185/195 can automatically adjust the partition wall 305 and the seat(s) 330 accordingly. When the partition wall 305 reaches the determined position the partition wall 305 can be locked into position via a locking system (e.g., a lock pin, teeth, grooves, tabs, slots, latching mechanisms, etc.) configured to secure the partition wall 305 in place. Similar such mechanisms can be utilized for securing the seat(s) 330 in a particular position.

In some implementations, the vehicle computing system 100 can adjust the partition wall 305 and/or seat(s) 330 based on a plurality of service assignments 230. For instance, the vehicle computing system 100 can obtain data indicative of a first service assignment associated with a first vehicle service. This can include, for example, a request to transport a first group of users to a first destination location (e.g., a restaurant). The vehicle computing system 100 can determine that the autonomous vehicle 105 has enough capacity to accept another service assignment (e.g., to pool vehicle services). The vehicle computing system 100 can obtain data indicative of a second service assignment associated with a second vehicle service. This can include, for example, a request to transport a second group of users to a second destination location (e.g., a stadium). The vehicle computing system 100 can determine a position of the partition wall 305 and/or a seat adjustment of the seat(s) 330 based at least in part on the first service assignment and the second service assignment such that the autonomous vehicle 105 is able to perform the first vehicle service concurrently with the second vehicle service. For example, the vehicle computing system 100 can determine a position of the partition wall 305 (and/or a seat adjustment) that allows a first compartment 310 to accommodate the first group of users and a second compartment 320 to accommodate the second group of users such that the first and second groups can ride within the autonomous vehicle 105 at the same time. The vehicle computing system 100 can communicate signals to adjust the partition wall 305 and/or the seats 330 according to the determined wall position and/or seat adjustment.

The vehicle computing system 100 can cause the autonomous vehicle 105 to initiate a motion control to travel to a location to pick-up the one or more user(s) and/or the one or more item(s). Before and/or while the autonomous vehicle is en route to the location, the vehicle computing system 100 can adjust the partition wall 305 and/or seat(s) 330, as described herein. The adjustment of the partition wall 305 and/or the seat adjustment can be completed before the autonomous vehicle 105 arrives at the location. In this way, the autonomous vehicle can re-configure the vehicle's interior 300 to accommodate the user(s) and/or the item(s) for transportation before the user(s) and/or the item(s) are onboard the autonomous vehicle 105.

Returning to FIGS. 4A-4C, in some implementations, the partition wall 305 can include a visual output device 420. The visual output device 420 can include a display device such as, for example, smart glass technology, a display screen, CRT, LCD, plasma screen, touch screen, TV, projector, other types of display devices and/or a combination thereof. The visual output device 420 can be configured to display various information for a user that is onboard the autonomous vehicle 105. For example, the display device can present a user interface that is indicative of the location of the autonomous vehicle 105 within a geographic area, proximity of the autonomous vehicle 105 to a destination location, media content (e.g., movies, shows, games, etc.), information associated with a destination location (e.g., weather information, flight information, etc.), traffic information, event information, and/or any other information. In some implementations, the vehicle computing system 100 can control what content is displayed via the visual output device 420.

The partition wall 305 can also, or alternatively, include other output devices. For example, the partition wall 305 can include one or more audio output device(s) such as one or more speakers. In some implementations, the partition wall 305 can provide information to one or more users via the one or more audio output devices (e.g., weather information, information associated with a destination, music, etc.). For example, in some implementations, the vehicle computing system 100 can control what content is provided via the audio output device(s).

Additionally, or alternatively, the partition wall 305 can include one or more input devices. For example, the partition wall 305 can be configured to communicate with one or more users via one or more input device(s) associated with the partition wall 305. By way of example, the partition wall 305 can include one or more touch screens capable of interacting with the one or more users through touch. For instance, the one or more users may touch one or more soft button(s) displayed via a user interface present on the partition wall 305. Moreover, in some implementations, the partition wall 305 can include one or more microphones configured to capture audio input. For example, the partition wall 305 can interact with one or more user(s) by obtaining audio input via the one or microphones for one or more user commands.

The partition wall 305 may act as a communicative link between one or more users and the vehicle computing system 100. By way of example, the one or more users can interact with the partition wall 305 to request specific information to be displayed via the partition wall 305. By way of example, the partition wall 305 can display traffic information in response to a user pressing a soft button indicative of traffic information. Moreover, in some implementations, the partition wall 305 can display traffic information in response to a user verbally requesting traffic information.

Figure 6:
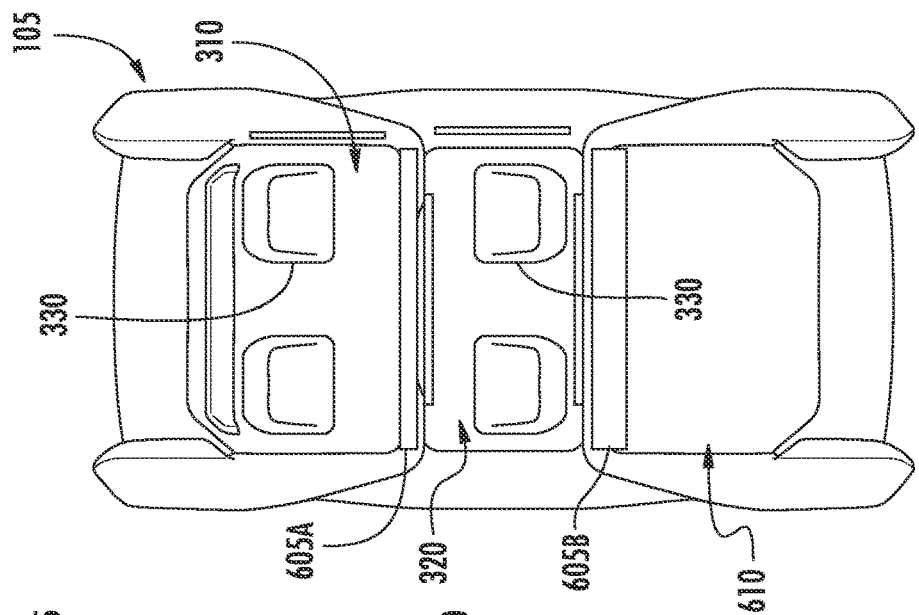
FIG. 6 depicts an example overhead-view diagram of an autonomous vehicle with multiple automatic partition walls according to example implementations of the present disclosure.

Although example implementations are described herein with respect to the autonomous vehicle 105 having one partition wall 305, this is not meant to be limiting. For example, FIG. 6 depicts an example overhead-view diagram of an autonomous vehicle 105 with multiple automatic partition walls according to example embodiments of the present disclosure. Autonomous vehicle 105 can have a plurality of partition walls 605A-B within the interior cabin 300 of the autonomous vehicle 105. One or more of the plurality of partition walls 605A-B can be configured like partition wall 305, as described herein.

The plurality of partition walls 305 can help to create/define more than two compartments within the autonomous vehicle. For example, the plurality of partition walls can include a first partition wall 605A and a second partition wall 605B. The vehicle computing system 100 can obtain data indicative of a first service assignment (e.g., to transport two users) and a second service assignment (e.g., to transport another two users). The first and second partition walls 605A-B can be positioned such that the first compartment 310 can be configured with one or more seat(s) 330 to seat the user(s) associated with the first service assignment and the second compartment 320 can be configured to seat the other users associated with the second service assignment. Moreover, a third compartment 610 can be configured without one or more seats 330 as a storage compartment (e.g., for transporting item(s) associated with the users of the first service assignment, for transporting item(s) associated with the users of the second service assignment, for transporting item(s) associated with a courier or delivery service assignment, etc.). In this manner, vehicle computing system 100 can configure the interior cabin 300 of autonomous vehicle 105 to handle multiple distinct user(s), item(s), service assignments, etc. with diverse needs.

Figure 7:
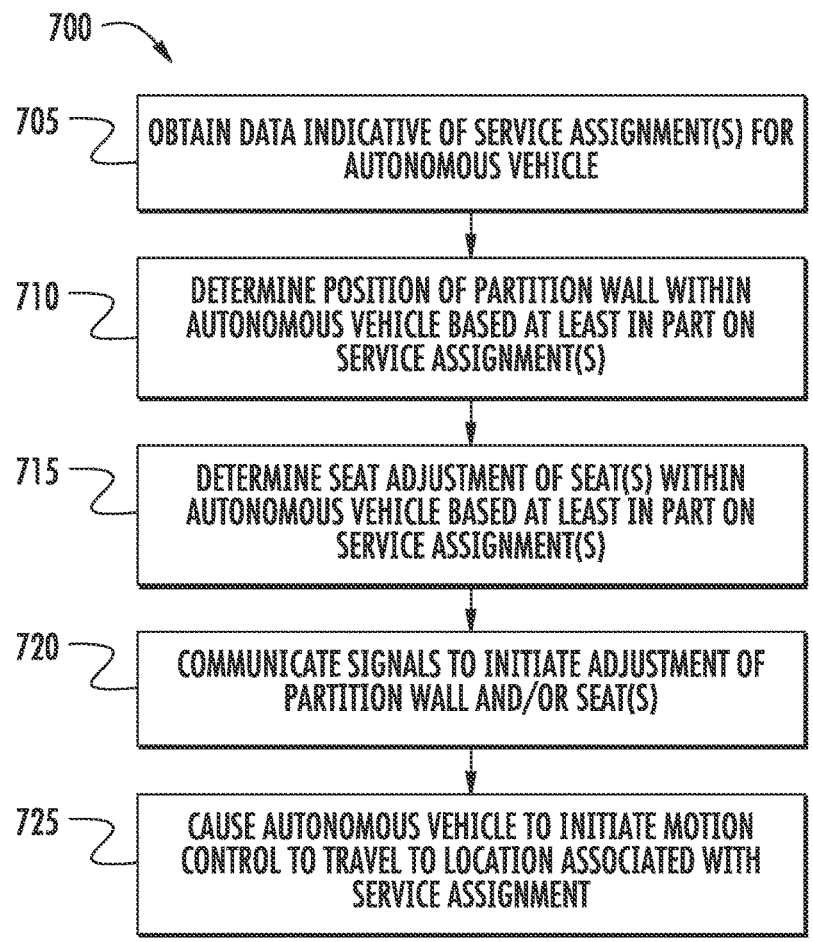
FIG. 7 depicts an example method for automatically adjusting a partition wall according to example implementations of the present disclosure.

FIG. 7 depicts an example method for automatically adjusting a partition wall according to example embodiments of the present disclosure. One or more portion(s) of the method 700 can be implemented by a computing system that includes one or more computing devices such as, for example, the computing systems described with reference to the other figures (e.g., the vehicle computing system 100, etc.). Each respective portion of method 700 can be performed by any (or any combination) of one or more computing devices. Moreover, one or more portion(s) of the method 700 can be implemented as an algorithm on the hardware components of the device(s) described herein (e.g., as in FIGS. 1-6 and/or 8-9), for example, to allow a vehicle to configure its interior (e.g., to adjust one or more partition wall(s) and/or seat(s)) to accommodate one or more users. FIG. 7 depicts elements performed in a particular order for purposes of illustration and discussion. Those of ordinary skill in the art, using the disclosers provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for example illustrated purposes and is not meant to be limiting. One of more portions of method 700 can be performed additionally, or alternatively, by other systems.

At (705), the method 700 can include obtaining data indicative of one or more service assignment(s) for an autonomous vehicle. For instance, a computing system (e.g., the vehicle computing system 100) can be configured to receive data indicative of one or more service assignment(s) 230 associated with the autonomous vehicle 105. The computing system (e.g., the vehicle computing system 100) can obtain data indicative of one or more service assignment(s) 230 associated with the autonomous vehicle 105, which can be indicative of a variety of information. For example, the one or more service assignment(s) 230 can be indicative of at least one of one or more users and/or one or more items to be transported within the autonomous vehicle 105. In addition, or alternatively, the one or more service assignment(s) 230 can be indicative of one or more location(s) (e.g., pick-up location(s), drop-off location(s), etc.).

For example, in some implementations, the one or more service assignment(s) 230 can include a first service assignment. The first service assignment can be indicative of a number of users to be transported within the autonomous vehicle 105. Additionally, or alternatively, the first service assignment can be indicative of one or more items to be transported within the autonomous vehicle 105. Moreover, in some implementations, the one or more service assignment(s) 230 can include a first service assignment associated with a first vehicle service, and a second service assignment associated with a second vehicle service (e.g., for vehicle service pooling). In some implementations, the first service assignment and/or the second service assignment can be associated with the transportation of just item(s), without user(s) (e.g., for a courier or delivery service, etc.).

At (710), the method 700 can include determining a position of a partition wall within autonomous vehicle based at least in part on the one or more service assignment(s). The autonomous vehicle 105 can include a main body 301 including a floor 325 and a ceiling 315 that at least partially define an interior cabin 300 of the autonomous vehicle 105. In addition, the autonomous vehicle 105 can include a partition wall 305 that is movable within the interior cabin 300 of the autonomous vehicle 105. In some implementations, the partition wall 305 can extend between the floor 325 and the ceiling 315 of the main body 301. For example, the partition wall 305 can extend from the floor 325 to the ceiling 315 defining the interior cabin 300. In some implementations, the partition wall 305 can include a display device 420 configured to display information for a user of the autonomous vehicle 105.

As described herein, the main body 301 of the autonomous vehicle 105 can include a first compartment 310 and a second compartment 320. For example, the partition wall 305 can include a first side and a second side. In such a case, the first side can at least partially define the first compartment 310 of the interior cabin 300 of the autonomous vehicle 105 and the second side can at least partially define the second compartment 320 of the interior cabin 300 of the autonomous vehicle 105. In some implementations, the partition wall 305 can be moveable in a longitudinal direction with respect to the autonomous vehicle 105. Moreover, in some implementations, the partition wall 305 can extend in a direction perpendicular to the longitudinal direction with respect to the autonomous vehicle 105, as described herein.

The computing system (e.g., vehicle computing system 100) can determine a position of the partition wall 305 within the interior cabin 300 of the autonomous vehicle 105 based at least in part on the one or more service assignments 230. In some implementations, the computing system (e.g., vehicle computing system 100) can determine the position of the partition wall 305 within the interior cabin 300 of the autonomous vehicle 105 based at least in part on at least one or the one or more users and the one or more items to be transported by within the autonomous vehicle 105. For example, in some implementations, the computing system (e.g., vehicle computing system 100) can determine the position of the partition wall 305 within the interior cabin 300 of the autonomous vehicle 105 based at least in part on the number of users to be transported within the autonomous vehicle 105 (e.g., such that a first compartment 310 can accommodate the user(s), etc.). Additionally, or alternatively, the computing system (e.g., vehicle computing system 100) can determine the position of the partition wall 305 within the interior cabin 300 of the autonomous vehicle 105 based at least in part on the one or more items to be transported within the autonomous vehicle 105 (e.g., such that a second compartment 320 can accommodate the item(s), etc.). In some implementations, the computing system (e.g., vehicle computing system 100) can determine the position of the partition wall 305 within the interior cabin 300 of the autonomous vehicle 105 based at least in part on the first service assignment and the second service assignment such that the autonomous vehicle 105 is able to perform the first vehicle service concurrently with the second vehicle service (e.g., transport a first set of user(s) concurrent with a second group of user(s), a group of item(s), etc.).

At (715), the method 700 can include determining a seat adjustment of one or more seat(s) within autonomous vehicle based at least in part on the one or more service assignment(s). In some implementations, the autonomous vehicle 105 can include one or more seats 330 within the interior cabin 300 of the autonomous vehicle 105. In some implementations, the one or more seat(s) 330 can be retractable into the floor 325 of the main body 301 of the autonomous vehicle 105. For example, the one or more seat(s) 330 can be retractable to allow for the movement of the partition wall 305 within the interior cabin 300 of the autonomous vehicle 105 (e.g., along an associated path, etc.). Moreover, in some implementations, the one or more seat(s) 330 can be coupled to the partition wall 305, as described herein.

The computing system (e.g., vehicle computing system 100) can determine a seat adjustment of the one or more seat(s) 330 within the interior cabin 300 of the autonomous vehicle 105 based at least in part on the one or more service assignments 230. The seat adjustment can be indicative of a change in the position, orientation, configuration, etc. of one or more seat(s) 330. For instance, in some implementations, the computing system (e.g., vehicle computing system 100) can determine the seat adjustment of the one or more seat(s) 330 within the interior cabin 300 of the autonomous vehicle 105 based at least in part on at least one of the one or more users or the one or more items to be transported within the autonomous vehicle 105. For example, the seat adjustment can include a retraction of the one or more seat(s) 330 into the floor 325 of the main body 301 of the autonomous vehicle 105 (e.g., to accommodate a re-configuration of the interior cabin 300 of the autonomous vehicle 105).

At (720), the method 700 can include communicating signals to initiate an adjustment of the partition wall and/or the one or more seat(s). The computing system (e.g., vehicle computing system 100) can communicate one or more first signals to initiate an adjustment of the partition wall 305 to the determined position within the interior cabin 300 of the autonomous vehicle 105. For example, the computing system (e.g., vehicle computing system 100) can be configured to adjust a position of the partition wall 305 within the interior cabin 300 based at least in part on the one or more service assignments 230 (e.g., to increase the size of a compartment to accommodate a specified number of users, etc.). The computing system can send the first signal(s) indicative of the determined wall position to the wall control system 185 to adjust the partition wall 305 accordingly.

Additionally, or alternatively, the computing system (e.g., vehicle computing system 100) can communicate one or more second signals to initiate the seat adjustment of the one or more seat(s) 330 within the interior cabin 300 of the autonomous vehicle 105. For example, the computing system (e.g., vehicle computing system 100) can be configured to adjust a position of the one or more seat(s) 330 within the interior cabin 300. To do so, the computing system can send the second signal(s) indicative of a determined seat position to the seat control system 195 to adjust the seat(s) 330 accordingly.

At (725), the method 700 can include causing the autonomous vehicle to initiate motion control to travel to one or more location(s) associated with the one or more service assignment(s). The computing system (e.g., vehicle computing system 100) can cause the autonomous vehicle 105 to initiate a motion control to travel to a location. For example, the autonomous vehicle 105 can implement a motion plan(s) 180 to cause the autonomous vehicle 105 to autonomously travel to a pick-up location associated with a service assignment (e.g., to pick-up user(s), item(s), etc.). Moreover, in some implementations, the computing system (e.g., vehicle computing system 100) can cause the adjustment of the partition wall 305 and the seat adjustment to be completed before the autonomous vehicle 105 arrives at the location (e.g., the pick-up location). In this way, the autonomous vehicle 105 can configure its interior cabin 300 such that it is accommodating for the user(s), item(s), etc.

Figure 8:
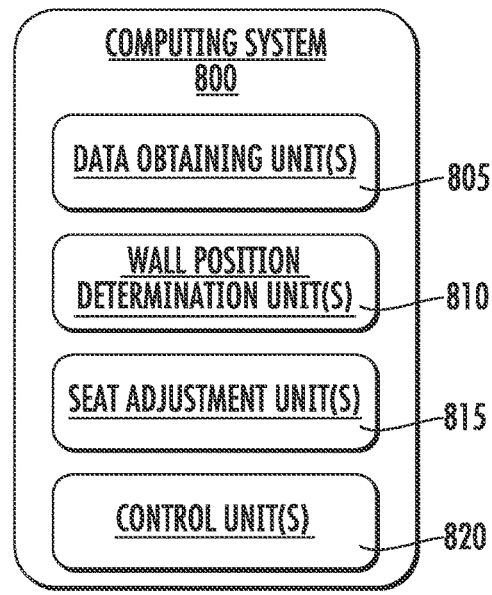
FIG. 8 depicts an example system with units for performing operations and functions according to example implementations the present disclosure.

Various means can be configured to perform the methods and processes described herein. For example, FIG. 8 depicts a diagram of an example a computing system 800 that includes various means according to example embodiments of the present disclosure. The computing system 800 can be and/or otherwise include, for example, the vehicle computing system 100/240, an operations computing system 200, a vehicle provider computing system 250, etc. The computing system 800 can include data obtaining unit(s) 805, wall position determination unit(s) 810, seat adjustment determination unit(s) 815, control unit(s) 820 and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., the data obtaining unit(s) 805) can be configured to obtain data indicative of one or more service assignments 230 associated with an autonomous vehicle 105 (e.g., from an accessible local memory). As described herein, the service assignment 230 can be indicative of a variety of information such as, for example, the number of user(s) and/or item(s) to be transported in the autonomous vehicle 105.

The means (e.g., the wall position determination unit(s) 810) can determine a position of a partition wall 305 within an interior cabin 300 of the autonomous vehicle 105 based at least in part on the one or more service assignments 230. As described herein, the interior cabin 300 is at least partially defined by a floor 325 and a ceiling 315 of a main body 301 of the autonomous vehicle 105 and the partition wall 305 can extend from the floor 325 to the ceiling 315 defining the interior cabin 300. The means (e.g., the wall position determination unit(s) 810) can adjust the position of the partition wall 305 to adjust the size and/or configuration of one or more compartments (e.g., compartments 310/320) within the interior cabin 300. For instance, the means (e.g., the wall position determination unit(s) 810) can access (e.g., via a memory) a data structure that is indicative of various pre-determined wall positions corresponding to various service assignment specifications. The data structure can include, for example, wall position data that indicates where the partition wall 305 should be positioned for a group of two users, four users, to accommodate a wheel chair, etc. The means (e.g., the wall position determination unit(s) 810) can utilize this data to determine the position of the partition wall 305 that will help address the specific service assignment 230 (e.g., so that users and/or item(s) have ample space).

The means (e.g., the seat adjustment unit(s) 815) can determine a seat adjustment of one or more seats 330 within the interior cabin 300 of the autonomous vehicle 105 based at least in part on the service assignment(s) 230. For instance, the means (e.g., the seat adjustment unit(s) 815) can determine whether the seat(s) 330 need to be adjusted to allow the partition wall 305 to move to a determined position. Additionally, or alternatively, the means (e.g., the seat adjustment unit(s) 815) can determine how many seats 330 and what seat configurations should be utilized given the specifications of a service assignment 230. For example, the means (e.g., the seat adjustment determination unit(s) 815) can access (e.g., via a memory) a data structure that is indicative of various pre-determined seat arrangements corresponding to various service assignment specifications. The data structure can include, for example, seat arrangement data that indicates how the seat(s) 330 should be arranged for a group of two users, four users, to accommodate a wheel chair, to provide storage space for certain item(s), etc. The means (e.g., the seat adjustment determination unit(s) 815) can utilize this data to determine a seat adjustment that will help address the specific service assignment(s) 230 (e.g., so that users and/or item(s) have sufficient seating/storage space).

The means (e.g., the control unit(s) 820) can communicate one or more signals to initiate an adjustment of the partition wall 305 to the determined position within the interior cabin 300 of the autonomous vehicle 105 and/or to initiate the seat adjustment of the one or more seats 330 within the interior cabin 300 of the autonomous vehicle 105. For instance, the means (e.g., the control unit(s) 820) can provide signals to the control systems associated with the partition wall 305 and/or the seat(s) 330. The signals can be indicative of the determined position of the partition wall 305 and/or the seat adjustment. The control systems can process these signals and adjust the partition wall 305 and/or seat(s) 330 accordingly.

Figure 9:
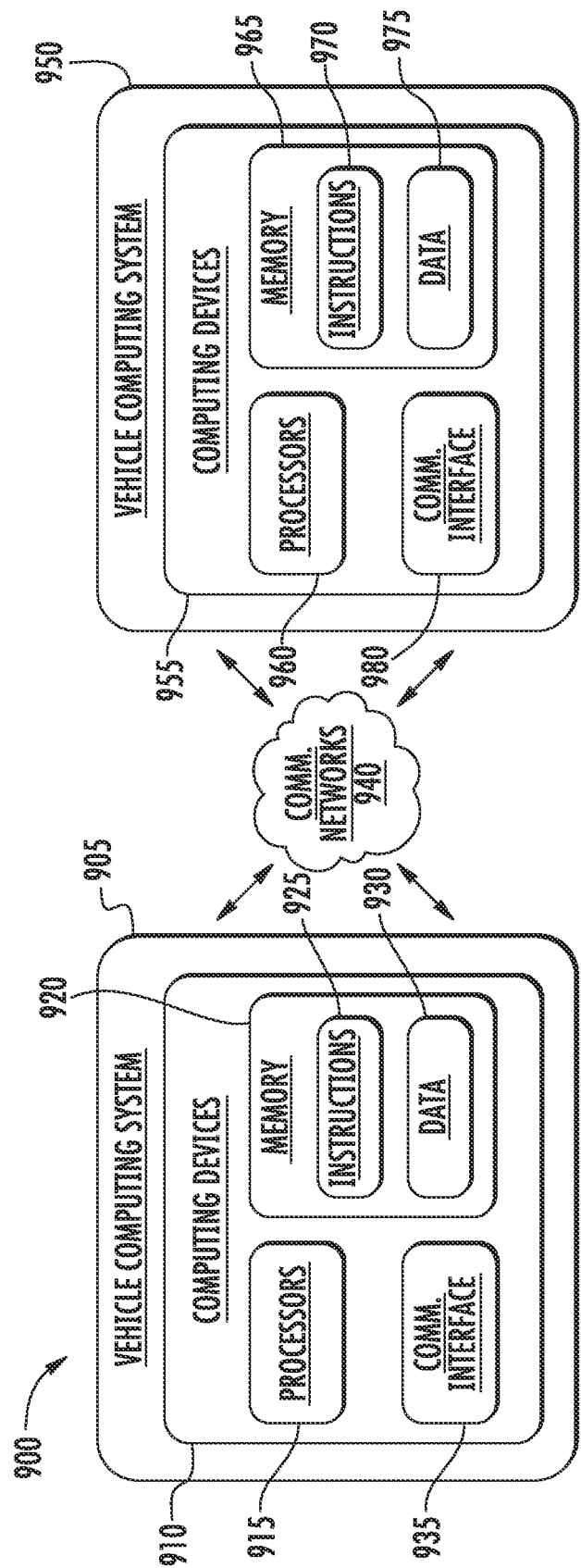
FIG. 9 depicts example system components according to example implementations of the present disclosure.

FIG. 9 depicts an example system 900 according to example embodiments of the present disclosure. The example system 900 illustrated in FIG. 9 is provided as an example only. The components, systems, connections, and/or other aspects illustrated in FIG. 9 are optional and are provided as examples of what is possible, but not required, to implement the present disclosure. The example system 900 can include a vehicle computing system 905 of a vehicle. The vehicle computing system 905 can represent/correspond to the vehicle computing systems 100, 240 described herein. The example system 900 can include a remote computing system 950 (e.g., that is remote from the vehicle computing system 905). The remote computing system 950 can represent/correspond to an operations computing system 200 described herein and/or vehicle provider computing systems 250 described herein. The vehicle computing system 905 and the remote computing system 950 can communicate with one another over one or more network(s) 940.

The computing device(s) 910 of the vehicle computing system 905 can include processor(s) 915 and a memory 920. The one or more processors 915 can be any suitable processing device (e.g., a processor core, a microprocessor, an ASIC, a FPGA, a controller, a microcontroller, etc.) and can be one processor or a plurality of processors that are operatively connected. The memory 920 can include one or more non-transitory computer-readable storage media, such as RAM, ROM, EEPROM, EPROM, one or more memory devices, flash memory devices, data registrar, etc., and combinations thereof.

The memory 920 can store information that can be accessed by the one or more processors 915. For instance, the memory 920 (e.g., one or more non-transitory computer-readable storage mediums, memory devices) on-board the vehicle can include computer-readable instructions 925 that can be executed by the one or more processors 915. The instructions 925 can be software written in any suitable programming language or can be implemented in hardware. Additionally, or alternatively, the instructions 925 can be executed in logically and/or virtually separate threads on processor(s) 915.

For example, the memory 920 can store instructions 925 that when executed by the one or more processors 915 cause the one or more processors 915 (the vehicle computing system 905) to perform operations such as any of the operations and functions of the vehicle computing system 100 (or for which it is configured), one or more of the operations and functions of the vehicle provider computing systems 250 (or for which it is configured), one or more of the operations and functions of the operations computing systems 200 described herein (or for which it is configured), one or more of the operations and functions for adjusting partition wall(s) and/or seat(s) within the vehicle's interior, one or more portions of method 700, and/or one or more of the other operations and functions of the computing systems described herein.

The memory 920 can store data 930 that can be obtained (e.g., acquired, received, retrieved, accessed, created, stored, etc.). The data 930 can include, for instance, sensor data, map data, vehicle state data, perception data, prediction data, motion planning data, data associated with a vehicle client, data associated with a service entity's telecommunications network, data associated with an API, data associated with a library, data associated with library parameters, data associated with service assignments, data associated with origin locations, data associated with destination locations, data associated with drop-locations, data/data structures associated with partition wall(s) and/or seat(s), wall position data, seat position data, data associated with user interfaces, data associated with user input, and/or other data/information such as, for example, that described herein. In some implementations, the computing device(s) 910 can obtain data from one or more memories that are remote from the vehicle computing system 905.

The computing device(s) 910 can also include a communication interface 935 used to communicate with one or more other system(s) on-board a vehicle and/or a remote computing device that is remote from the vehicle (e.g., of the system 950). The communication interface 935 can include any circuits, components, software, etc. for communicating via one or more networks (e.g., network(s) 940). The communication interface 935 can include, for example, one or more of a communications controller, receiver, transceiver, transmitter, port, conductors, software and/or hardware for communicating data.

The remote computing system 950 can include one or more computing device(s) 955 that are remote from the vehicle computing system 905. The computing device(s) 955 can include one or more processors 960 and a memory 965. The one or more processors 960 can be any suitable processing device (e.g., a processor core, a microprocessor, an ASIC, a FPGA, a controller, a microcontroller, etc.) and can be one processor or a plurality of processors that are operatively connected. The memory 965 can include one or more tangible, non-transitory computer-readable storage media, such as RAM, ROM, EEPROM, EPROM, one or more memory devices, flash memory devices, data registrar, etc., and combinations thereof.

The memory 965 can store information that can be accessed by the one or more processors 960. For instance, the memory 965 (e.g., one or more tangible, non-transitory computer-readable storage media, one or more memory devices, etc.) can include computer-readable instructions 970 that can be executed by the one or more processors 960. The instructions 970 can be software written in any suitable programming language or can be implemented in hardware. Additionally, or alternatively, the instructions 970 can be executed in logically and/or virtually separate threads on processor(s) 960.

For example, the memory 965 can store instructions 970 that when executed by the one or more processors 960 cause the one or more processors 960 to perform operations such as any of the operations and functions of the operations computing systems 200 described herein, any operations and functions of the vehicle provider computing systems 250, any of the operations and functions for which the operations computing systems 200 and/or the vehicle computing systems 100 are configured, one or more of the operations and functions of the vehicle computing system 100 described herein, one or more of the operations and functions for determining wall/seat positions and adjusting wall(s)/seat(s) (e.g., via remote communication with the vehicle), one or more portions of method 700, and/or one or more of the other operations and functions described herein.

The memory 965 can store data 975 that can be obtained. The data 975 can include, for instance, data associated with service requests, communications associated with/provided by vehicles, data to be communicated to vehicles, application programming interface data, data associated with vehicles and/or vehicle parameters, data associated with drop-off locations, data/data structures associated with partition wall(s) and/or seat(s), wall position data, seat position data, data associated with user interfaces, data associated with user input, data associated with service assignments, data associated with acceptances and/or rejections of service assignments, data associated with different service entities, data associated with fleet(s) of vehicles, and/or other data/information such as, for example, that described herein.

The computing device(s) 955 can also include a communication interface 980 used to communicate with one or more system(s) onboard a vehicle and/or another computing device that is remote from the system 950. The communication interface 980 can include any circuits, components, software, etc. for communicating via one or more networks (e.g., network(s) 940). The communication interface 980 can include, for example, one or more of a communications controller, receiver, transceiver, transmitter, port, conductors, software and/or hardware for communicating data.

The network(s) 940 can be any type of network or combination of networks that allows for communication between devices. In some embodiments, the network(s) 940 can include one or more of a local area network, wide area network, the Internet, secure network, cellular network, mesh network, peer-to-peer communication link and/or some combination thereof and can include any number of wired or wireless links. Communication over the network(s) 940 can be accomplished, for instance, via a communication interface using any type of protocol, protection scheme, encoding, format, packaging, etc.

Computing tasks, operations, and functions discussed herein as being performed at one computing system herein can instead be performed by another computing system, and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system comprising:
   one or more processors; and
   one or more tangible, non-transitory, computer readable media that store instructions that are executable by the one or more processors to cause the computing system to perform operations comprising:
      accessing data indicative of a first vehicle service associated with an autonomous vehicle;
      determining a position of a partition wall within an interior space of the autonomous vehicle based on the first vehicle service;
         wherein the interior space is at least partially defined by a floor and a ceiling, the partition wall extending at least partially from the floor to the ceiling, and
         wherein the partition wall at least partially defines one or more compartments within the interior space;
      accessing data indicative of a request to perform a second vehicle service;
      determining, based at least in part on the position of the partition wall and the request to perform the second vehicle service, that the autonomous vehicle is available to perform the second vehicle service; and
      transmitting data indicative of an acceptance of the request to perform the second vehicle service using the autonomous vehicle.

2. The computing system of claim 1, the operations further comprising:
   based at least in part on the first vehicle service and the second vehicle service, adjusting the partition wall to the determined position within the interior space.

3. The computing system of claim 1, the operations further comprising:
   determining an updated position of the partition wall within the interior space associated with the autonomous vehicle based on the first vehicle service and the second vehicle service.

4. The computing system of claim 3, the operations further comprising:
   adjusting the partition wall to the updated determined position within the interior space.

5. The computing system of claim 3, wherein the partition wall creates at least one of a first compartment for the first vehicle service or a second compartment for the second vehicle service.

6. The computing system of claim 1, wherein the autonomous vehicle comprises one or more seats located within the interior space associated with the autonomous vehicle.

7. The computing system of claim 6, the operations further comprising:
   determining a seat configuration for the one or more seats based on at least one of: (i) the first vehicle service or (ii) the second vehicle service; and
   adjusting the one or more seats based on the determined seat configuration.

8. The computing system of claim 7, wherein adjusting the one or more seats based on the determined seat configuration comprises retracting the one or more seats into the floor.

9. The computing system of claim 1, the operations further comprising:
   accessing a data structure comprising a plurality of pre-determined seat arrangements corresponding to various service assignment parameters;
   selecting a first pre-determined seat arrangement based on one or parameters associated with the first vehicle service; and
   adjusting the one or more seats to a position associated with the first pre-determined seat arrangement of the various pre-determined seat arrangements.

10. The computing system of claim 1, wherein the first vehicle service is associated with the autonomous vehicle based at least in part on the autonomous vehicle being assigned to perform the first vehicle service.

11. The computing system of claim 1, wherein at least one of the first vehicle service or the second vehicle service is indicative of a number of users to be transported within the autonomous vehicle, and wherein determining the position of the partition wall comprises:
   determining the position of the partition wall within the interior space of the autonomous vehicle based at least in part on the number of users to be transported within the autonomous vehicle.

12. The computing system of claim 1, wherein at least one of the first vehicle service or the second vehicle service is indicative of one or more items be transported within the autonomous vehicle, and wherein determining the position of the partition wall comprises:
   determining the position of the partition wall within the interior space of the autonomous vehicle based at least in part on the one or more items to be transported within the autonomous vehicle.

13. The computing system of claim 1, wherein the computing system is onboard the autonomous vehicle.

14. A computer-implemented method for autonomous vehicle configuration comprising:
   accessing data indicative of a first vehicle service associated with an autonomous vehicle;
   determining a position of a partition wall within an interior space of the autonomous vehicle based on the first vehicle service:
      wherein the interior space is at least partially defined by a floor and a ceiling, the partition wall extending at least partially from the floor to the ceiling, and
      wherein the partition wall at least partially defines one or more compartments;
   accessing data indicative of a request to perform a second vehicle service;
   determining, based at least in part on the position of the partition wall and the request to perform the second vehicle service, that the autonomous vehicle is available to perform the second vehicle service; and
   transmitting data indicative of an acceptance of the request to perform the second vehicle service using the autonomous vehicle.

15. The computer-implemented method of claim 14, based at least in part on the first vehicle service and the second vehicle service, adjusting the partition wall to the determined position within the interior space.

16. The computer-implemented method of claim 14, comprising:
   determining an updated position of the partition wall within the interior space associated with the autonomous vehicle based on the first vehicle service and the second vehicle service; and
   adjusting the partition wall to the updated determined position within the interior space.

17. The computer-implemented method of claim 14, wherein the first vehicle service comprises transportation of one or more users.

18. The computer-implemented method of claim 14, wherein the second vehicle service comprises transportation of one or more items.

19. The computer-implemented method of claim 14, wherein determining the position of the partition wall within the interior space of the autonomous vehicle comprises:
   determining the position of the partition wall within the interior cabin of the autonomous vehicle based at least in part on the first vehicle service and the second vehicle service such that the autonomous vehicle is able to perform the first vehicle service concurrently with the second vehicle service.

20. One or more tangible, non-transitory, computer readable media that store instructions that are executable by one or more processors to cause the one or more processors to perform operations comprising:
   determining a position of a partition wall within an interior space of an autonomous vehicle based on a first vehicle service;
      wherein the interior space is at least partially defined by a floor and a ceiling, the partition wall extending at least partially from the floor to the ceiling, and
      wherein the partition wall at least partially defines one or more compartments;
   accessing data indicative of a request to perform a second vehicle service;
   determining, based at least in part on the position of the partition wall and the request to perform the second vehicle service, that the autonomous vehicle is available to perform the second vehicle service; and
   transmitting data indicative of an acceptance of the request to perform the second vehicle service using the autonomous vehicle.

* * * * *